United States Patent
Bartel

(10) Patent No.: US 8,157,316 B1
(45) Date of Patent: Apr. 17, 2012

(54) TRANSLATING CARGO BED

(75) Inventor: Harlan J. Bartel, Newton, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

(21) Appl. No.: 12/657,937

(22) Filed: Jan. 29, 2010

Related U.S. Application Data

(60) Provisional application No. 61/206,418, filed on Jan. 30, 2009.

(51) Int. Cl.
*B62D 33/02* (2006.01)

(52) U.S. Cl. .................................... 296/183.2

(58) Field of Classification Search ............... 296/183.2; 298/11, 17 R, 17.5
See application file for complete search history.

(56) References Cited

U.S. PATENT DOCUMENTS

| | | | |
|---|---|---|---|
| 1,650,815 A * | 11/1927 | Barrett | 298/11 |
| 3,356,240 A | 12/1967 | Zink | |
| 3,902,616 A * | 9/1975 | Santic et al. | 414/420 |
| 4,230,359 A | 10/1980 | Smith | |
| 4,540,032 A | 9/1985 | Pelletier et al. | |
| 4,671,729 A | 6/1987 | McFarland | |
| 4,951,999 A * | 8/1990 | Rudolph et al. | 298/11 |
| 4,966,242 A | 10/1990 | Baillargeon | |
| 4,968,096 A | 11/1990 | Chattin | |
| 5,192,189 A * | 3/1993 | Murata et al. | 414/477 |
| 5,364,224 A | 11/1994 | Padgett | |
| 5,427,495 A | 6/1995 | Vlaanderen | |
| 5,921,743 A | 7/1999 | Slagter | |
| 6,036,275 A | 3/2000 | Hansen et al. | |
| 6,050,769 A | 4/2000 | Papalia et al. | |
| 6,158,947 A | 12/2000 | Goiran et al. | |
| 6,224,161 B1 | 5/2001 | Hansen et al. | |
| D459,368 S | 6/2002 | Westendorf et al. | |
| 6,409,457 B1 | 6/2002 | Korycan et al. | |
| 6,435,806 B1 | 8/2002 | Rinkerknecht | |
| 6,688,837 B2 | 2/2004 | Rinkerknecht | |
| 6,749,389 B1 | 6/2004 | Vlaanderen | |
| 6,789,829 B1 * | 9/2004 | Kapels | 296/11 |
| 6,817,825 B1 | 11/2004 | O'Hagen | |
| 6,916,142 B2 | 7/2005 | Hansen et al. | |
| 7,033,128 B2 * | 4/2006 | Poindexter | 414/544 |
| 7,037,062 B2 * | 5/2006 | Oliver | 414/478 |
| 7,055,878 B2 * | 6/2006 | Imhof | 296/26.07 |
| 7,189,048 B2 | 3/2007 | Rinkerknecht | |
| D572,277 S | 7/2008 | Pinther et al. | |
| 2004/0156703 A1 | 8/2004 | Benedikt | |
| 2005/0220591 A1 | 10/2005 | Doskocil | |
| 2006/0033378 A1 | 2/2006 | Sargent et al. | |
| 2006/0119164 A1 | 6/2006 | Heskin | |
| 2007/0212205 A1 | 9/2007 | Lowecki | |
| 2008/0112786 A1 | 5/2008 | Deist et al. | |

OTHER PUBLICATIONS

Sales brochure for the Terex(R), TA2E, TA2SE Power Tip/Swivel Elevating Site Dumpers, Publication Date Nov. 13, 2007 (2 pages).
Sales brochure for the Wacker Neuson All-wheel Dumper 1001, Published in the year 2001 (2 pages).

* cited by examiner

*Primary Examiner* — H Gutman

(57) ABSTRACT

A vehicle includes a vehicle frame, a plurality of wheels and a cargo bed assembly. A cargo bed translation mechanism is operable between the vehicle frame and the cargo bed to translate the cargo bed between a range of positions including a first transport position, a plurality of raised position a variety of loading positions. A cargo bed dumping mechanism is operable for tipping the cargo bed to dump the contents of the cargo bed at least from the transport position and the raised positions.

9 Claims, 28 Drawing Sheets

TRANSLATING CARGO BED

RELATED APPLICATIONS

This application claims the benefit of U.S. Provisional Patent Application Ser. No. 61/206,418 filed on Jan. 30, 2009 which is incorporated herein by reference.

FIELD OF THE INVENTION

This invention relates to a vehicle, and in particular a vehicle having a cargo bed which can be translated between a variety of positions.

BRIEF DESCRIPTION OF THE INVENTION

The present translating cargo bed is intended for use with a vehicle includes a vehicle frame, a prime mover such as an engine, a plurality of wheels, including, for example, a pair of rear wheels. A cargo bed translation mechanism is operatively positioned between the vehicle frame and the cargo bed and is able to translate the cargo bed through a range of positions including a first transport position in which the cargo bed is securely supported for transport and a plurality of other positions.

A cargo bed sub-frame supports the cargo bed and is mounted to the translation mechanism. The cargo bed sub-frame is preferably adapted to receive the cargo bed in a sliding fashion so that the cargo bed may be removed and replaced as needed.

The cargo bed is pivotably mounted to the cargo bed sub-frame at the rear end of the cargo bed and a dump mechanism connecting between the cargo bed sub-frame and the cargo bed and is operable for rotating the cargo bed from a level cargo hauling position to a tilted dumping position in order to dump out the contents of the cargo bed.

An optional outrigger assembly may be added to the vehicle in order to stabilize the vehicle as the cargo bed is translated rearwardly toward the loading position. The outrigger assembly includes rear support members which, when deployed behind the rear wheels, contact the ground to stabilize the vehicle when the cargo bed is translated to the rear of the vehicle.

DETAILED DESCRIPTION OF THE INVENTION

Figure 1:
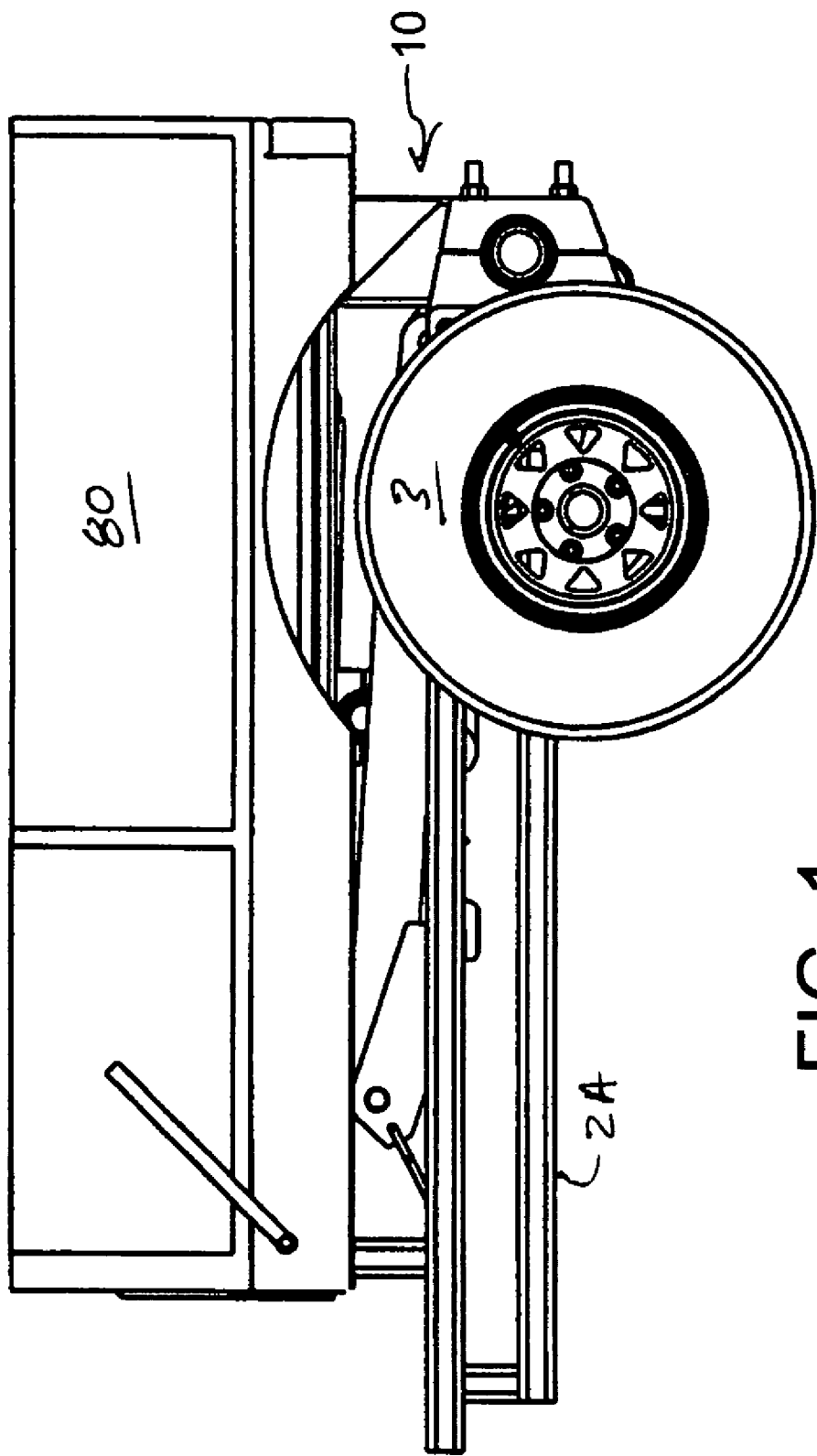
FIG. 1 is a side view of the rear portion of a vehicle with a cargo bed in a transport position.

Referring to the drawings, in FIG. 1 a vehicle frame 2A supports a cargo bed translation mechanism 10 which is connected to a cargo bed 80. Vehicle frame 2A is conventionally supported by a pair of opposite rear wheels 3. The remainder of the vehicle could be a utility vehicle used for grounds maintenance or light construction or the like and would typically include a seat for accommodating an operator, an engine, and appropriate controls for operating the vehicle.

Figure 2:
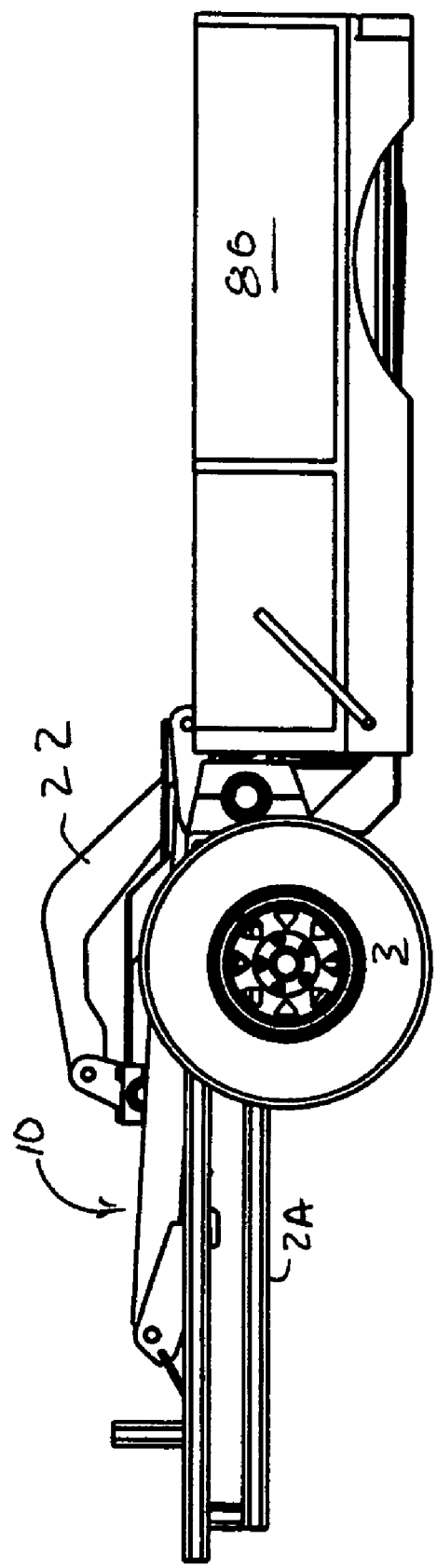
FIG. 2 is a side view of a the rear portion of a vehicle with a cargo bed in a loading position.
Figure 8:
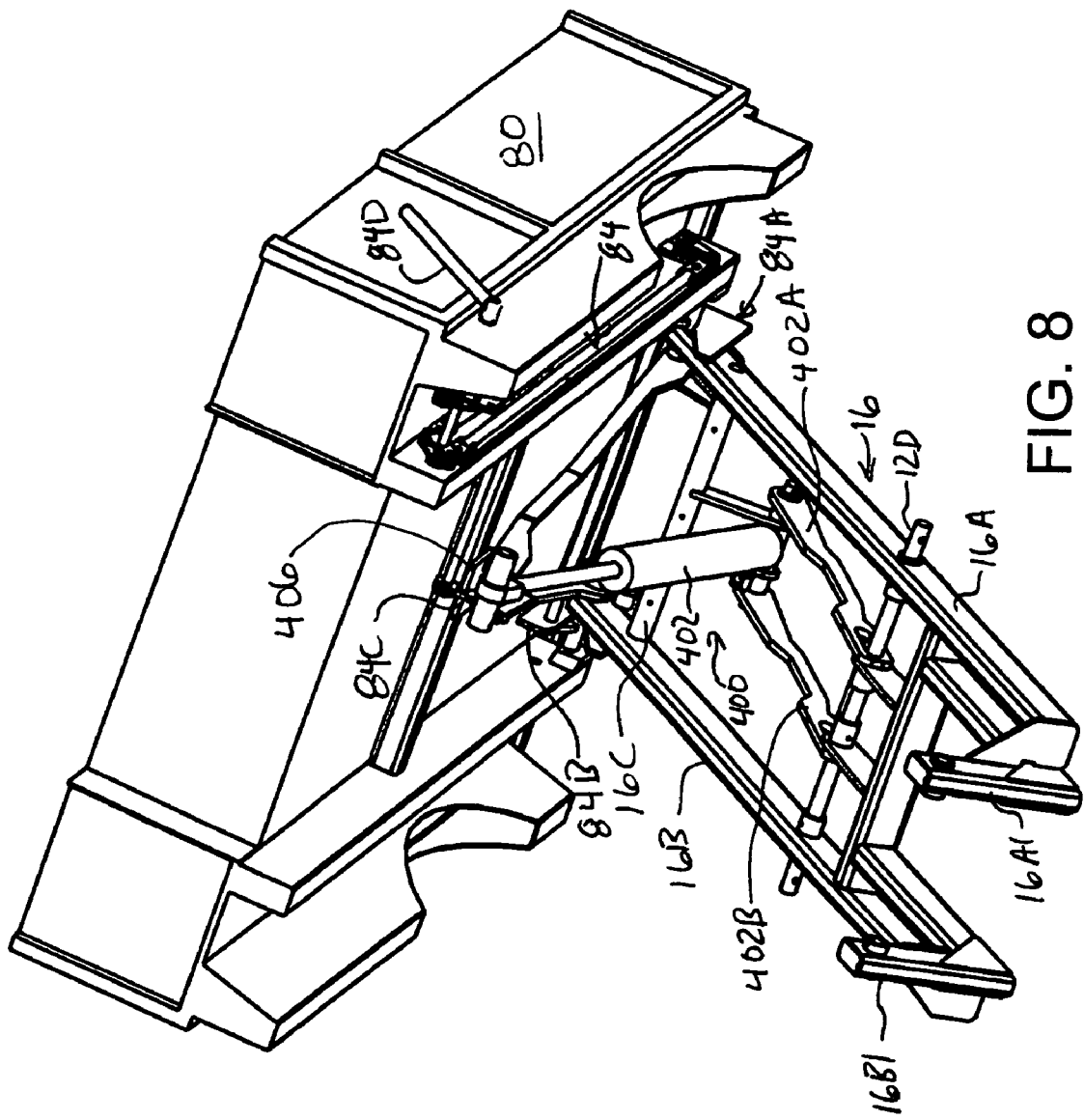
FIG. 8 is a perspective view showing the cargo bed sub-frame with the dump mechanism in the extended position and the cargo bed tilted up in a dumping position.
Figure 9:
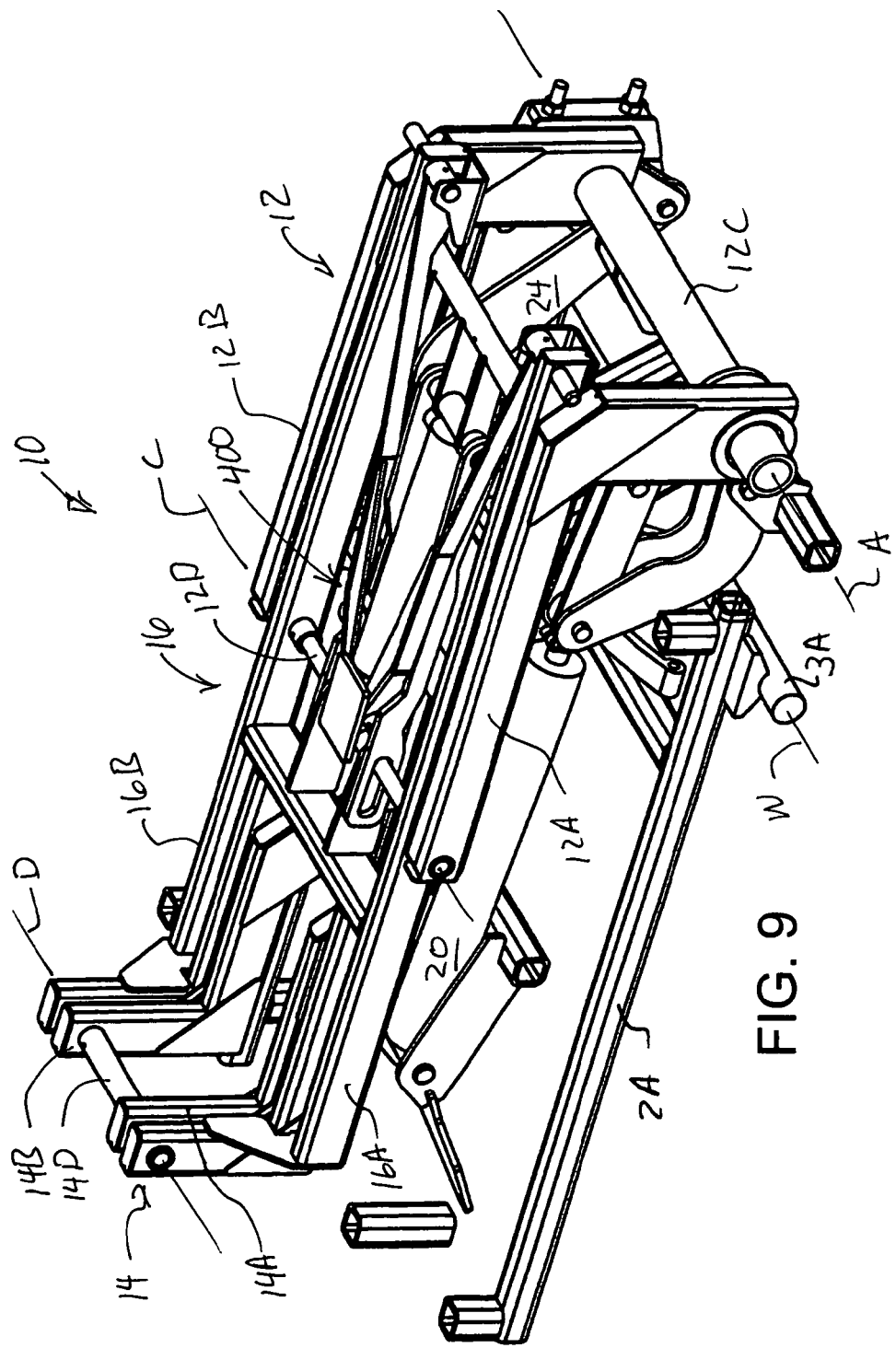
FIG. 9 is a perspective view of the translation mechanism in the transport position.

In the embodiment shown in FIGS. 1-13, translation mechanism 10 includes a parallel linkage structure which supports cargo bed 80. The purpose of translation mechanism 10 is to translate cargo bed 80, for example, between a transport position as shown in FIG. 1 and a loading position as shown in FIG. 2 as well as to translate cargo bed 80 to intermediate positions there between. When in a transport position, cargo bed 80 is generally level and preferably located such that the center of gravity of cargo bed 80 and its contents, if any, are located forward of the center of rear wheels 3 or axle W of vehicle 2 as shown in FIGS. 1 and 9. When in a loading position, for example as shown in FIG. 2, cargo bed 80 is translated so that it is at rest on the ground or at least supported near ground level preferably behind rear wheels 3.

Figure 10:
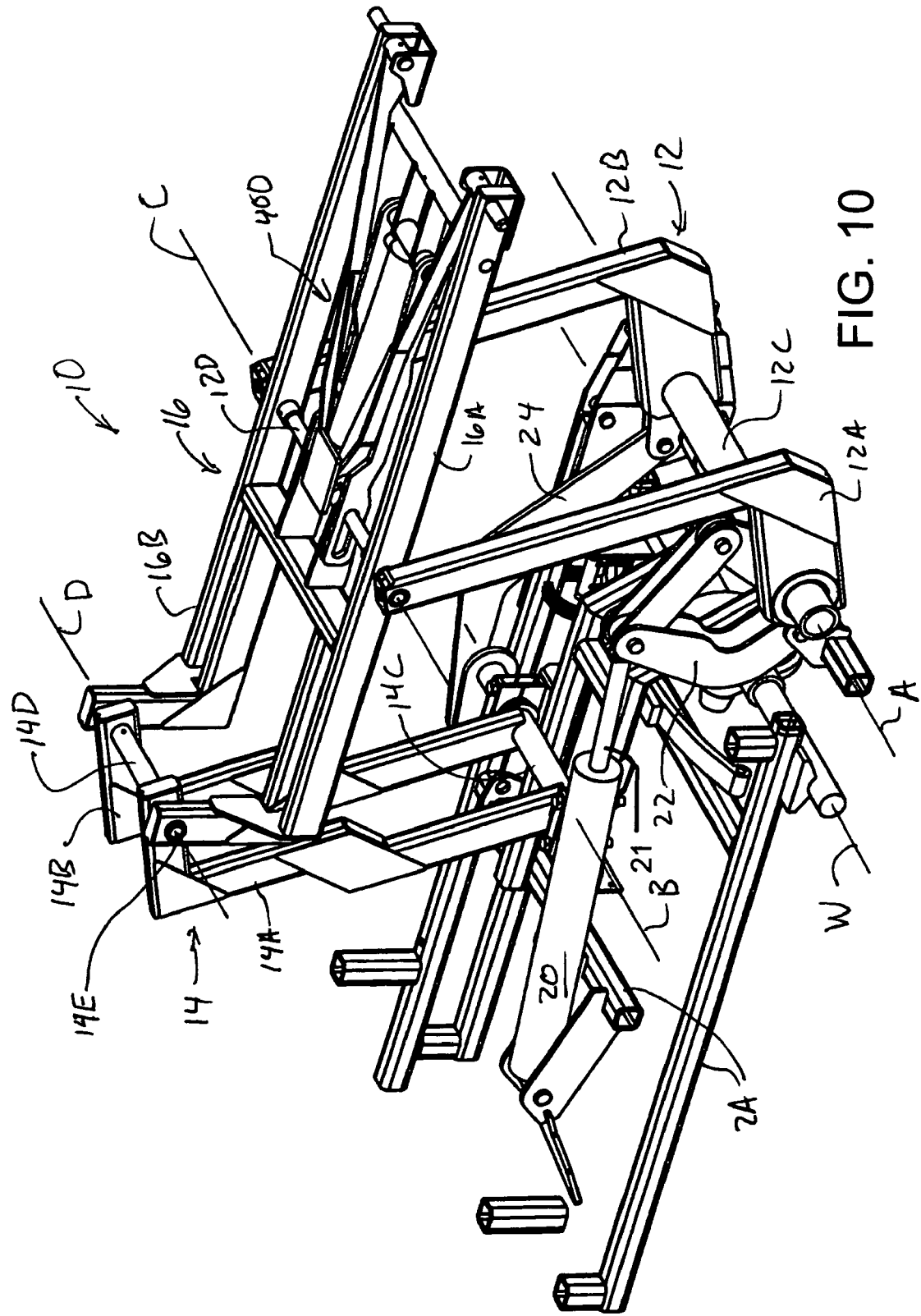
FIG. 10 is a perspective view showing the translation mechanism partially extended from the transport position.
Figure 11:
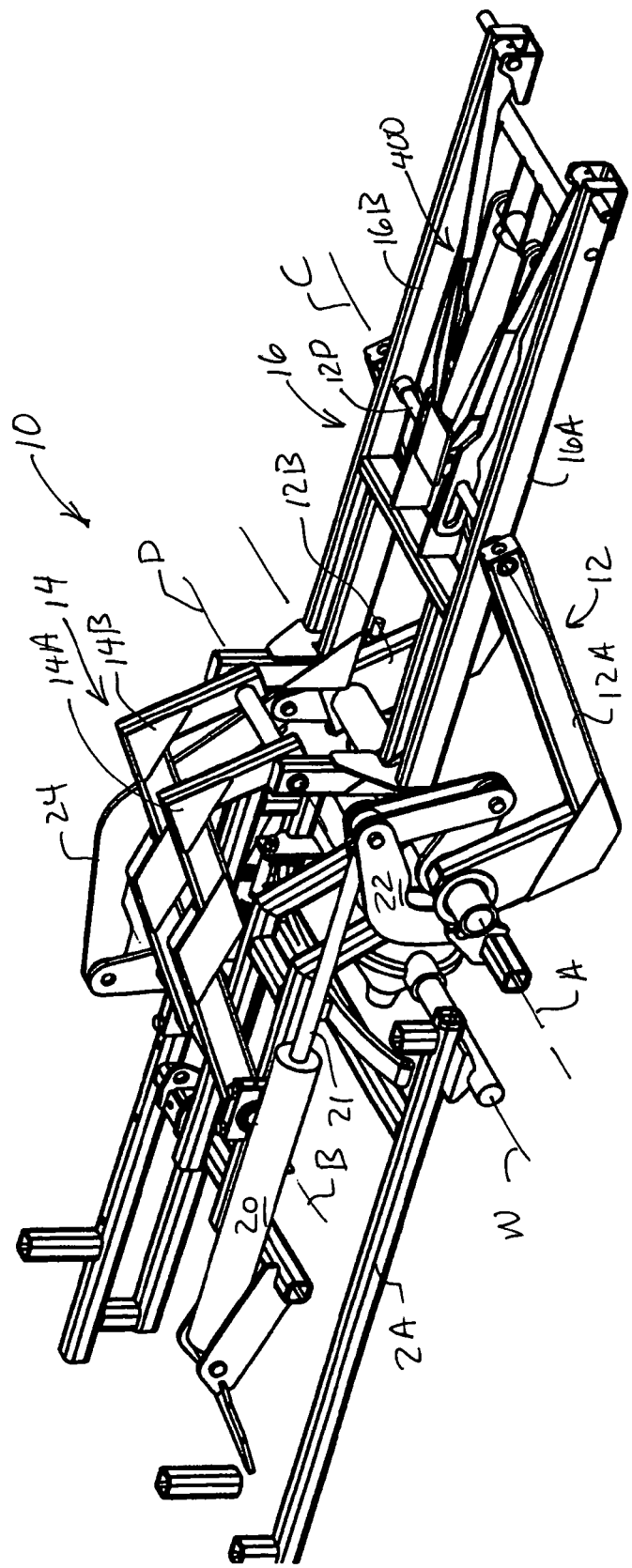
FIG. 11 is a perspective view showing the translation mechanism extended mostly toward the loading position.
Figure 12:
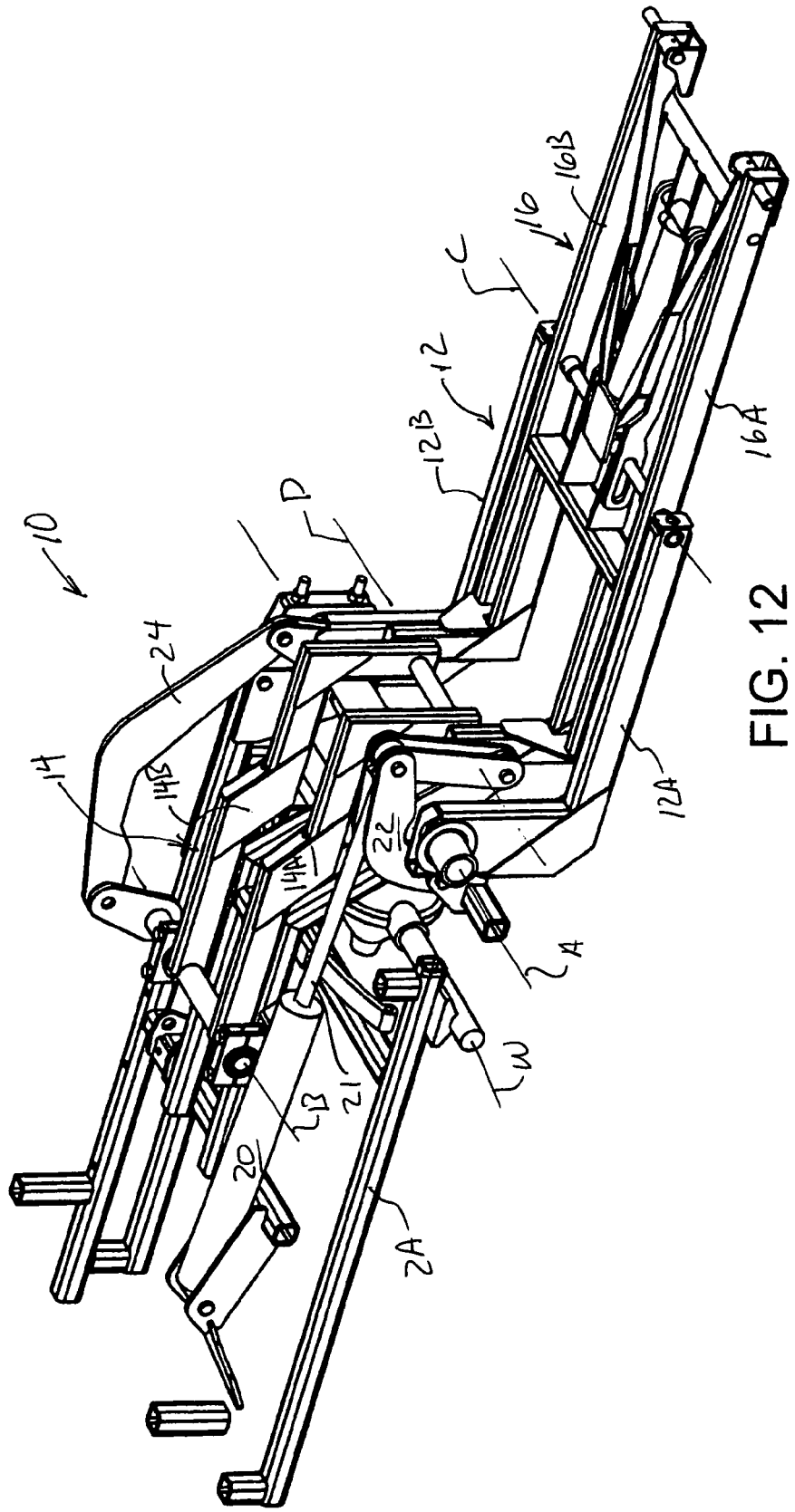
FIG. 12 is a perspective view showing the translation mechanism fully extended in the loading position.

The movement of translation mechanism 10 between the transport position shown in FIG. 1 and the position shown in FIG. 2 can be best understood by referring to FIGS. 9-12 wherein much of the vehicle body has been removed for clarity. An axle 3A for mounting rear wheel 3 is shown in FIGS. 9-12 without the wheels for clarity. As can be best seen in FIG. 10, translation mechanism 10 includes a rear pivot frame 12, a forward pivot frame 14, a cargo-bed sub frame 16 and an actuator 20. As can be seen in FIG. 10, rear pivot frame 12 and forward pivot frame 14 are pivotably mounted at their respective proximate ends to vehicle frame 2A for rotation about axes A and B respectively. Axes A and B are generally horizontal, transverse, parallel to each other and spaced away from each other in a longitudinal direction. Rear pivot frame 12 and forward pivot frame 14 are also pivotably joined at their respective distal ends to cargo bed sub-frame 16 for rotation about axes C and D respectively. Axes C and D are fixed relative to cargo bed sub-frame 16, are also generally horizontal and transverse and are also spaced away from each other in a longitudinal direction. As can be further seen in FIG. 10, actuator 20 is operably positioned to connect between vehicle frame 2A and rear pivot frame 12 by a linkage assembly 22. In this example, actuator 20 is a hydraulic cylinder having a drive rod 21 which is connected with linkage assembly 22 to smoothly rotate rear pivot frame 12 around axis A through a range of motion. Also, in this example, a stabilizer link 24 connects between crank arms 24A and 24B which extend from 12C and 14C, respectively, and which together stabilize translation mechanism 10. Thus, in order to translate cargo bed sub-frame 16 from a transport position shown in FIG. 9, through intermediate positions shown in FIGS. 10 and 11, to a loading position shown in FIG. 12, actuator 20 is activated to cause the simultaneous rotation of rear pivot frame 12 and forward pivot frame 14 about their respective axes A and B.

As noted above, rear pivot frame 12, which can be best seen in FIG. 10, may be considered as single frame that is pivotably mounted to vehicle frame 2A for rotation about axis A. In this example, rear pivot frame 12 includes a left side member 12A, a right side member 12B, a transverse base tube 12C and a transverse end shaft 12D. The proximate ends of left side member 12A and right side member 12B are preferably fixed to base tube 12C. Base tube 12C rotates relative to vehicle frame 2A about horizontal transverse axis A. Transverse end shaft 12D extends between the distal ends of left side member 12A and right side member 12B and rotates about axis C. In order to define a rigid frame, it is preferable to fix the opposite ends of end shaft 12D to the respective distal ends of left and right side members 12A and 12B. In this example, left side member 12A and right side member 12B are generally L shaped in order to clear various structures of vehicle frame 2A. This configuration is advantageous in this example so that translation mechanism 10 occupies a minimum volume when it is in the transport position.

Forward pivot frame 14 may also be considered as single frame which is pivotably mounted to vehicle frame 2A for rotation about axis B. In this example, forward pivot frame 14 includes a left side member 14A, a right side member 14B, a transverse base tube 14C and a transverse end shaft 14D. The proximate ends of left side member 14A and right side member 14B are preferably fixed to base tube 14C. Base tube 14C is preferably adapted for rotating on a shaft (not shown) which is fixed to vehicle frame 2A. Transverse end shaft 14D extends between the distal ends of left side member 14A and right side member 14B and is arranged to rotate around axis D. In order to define a rigid frame, it is preferable to weld or otherwise fix or fasten the opposite ends of end shaft 14D to the respective distal ends of left and right side members 14A and 14B. As was the case with rear pivot frame 12, in this example, in order to clear various structures of vehicle frame 2A, left side member 14A and right side member 14B of forward pivot frame 14 are generally L shaped and include a first portion and a second portion. The second portions of left and right side members 14A and 14B are upright when translation mechanism 10 is in the transport position shown in FIG. 9. The first portions of left and right side members 14A and 14B are longer than the second portions and are also jogged to clear portions of vehicle frame 2A. The first portions of left and right side members 14A and 14B are generally horizontal when translation mechanism 10 is in the transport position shown in FIG. 9.

Figure 7:
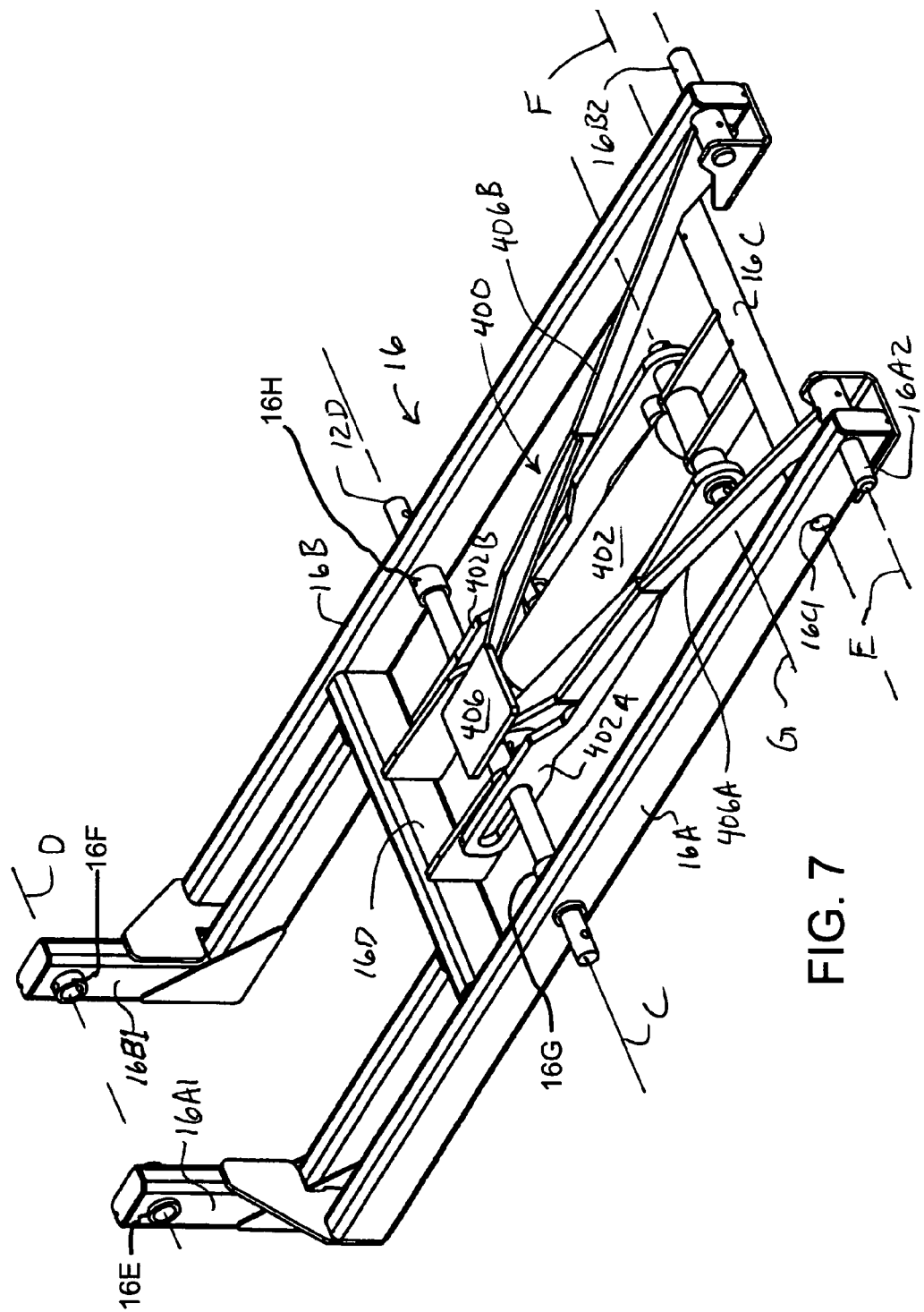
FIG. 7 is a perspective of the cargo bed sub-frame with the cargo bed removed showing the dump mechanism in a retracted position.

Cargo bed sub-frame 16 is shown in isolation in FIG. 7. In this example, cargo bed sub-frame 16 is a rigid frame and the various components of sub-frame 16 are generally oriented in a horizontal plane. Sub-frame 16 includes two longitudinal beam assemblies 16A and 16B that are interconnected by a transverse tube 16C at one end and a transverse member 16D mounted toward the opposite end. Transverse tube 16C is mounted for rotation about axis F on a transverse shaft 16C1 that is welded or otherwise fixed to sub-frame 16 between beam assemblies 16A and 16B. Longitudinal beam assemblies 16A and 16B further include upright end members 16A1 and 16B1 which further include concentric bushings 16E and 16F adapted for receiving end shaft 14D of forward pivot frame 14. Although end shaft 12D of rear pivot frame 12 is not a part of cargo bed sub-frame 16, it is nevertheless shown in FIG. 7 as being received by two bushings 16G and 16H mounted in opposite longitudinal beam assemblies 16A and 16B. When cargo bed sub-frame 16 is translated as shown in FIGS. 9-12, it remains substantially level. Cargo bed sub-frame 16 remains level, as is the case with a parallel linkage, because ideally, the distance between axes A and C is constant and is equal to the distance between axes B and D which is also constant, and the distance between axes C and D is constant and is equal to the distance between axes A and B which is also constant.

As noted above, cargo bed sub-frame 16 is adapted for receiving and supporting cargo bed 80 as shown in FIGS. 1 and 2. Accordingly, longitudinal beam assemblies 16A and 16B of sub-frame 16 present two horizontally extending pins 16A2 and 16B2 located at the back end of sub-frame 16 that are adapted for receiving corresponding latch elements associated with cargo bed 80. Pins 16A2 and 16B2 are centered on a horizontal, transverse axis E shown in FIG. 7. Once cargo bed 80 is positioned so that its latches engage pins 16A2 and 16B2 it is possible to tilt cargo bed 80 about axis E through a range of positions between a cargo hauling position shown in FIG. 1 and a cargo dumping position shown in FIG. 8. As can be seen in FIG. 8, cargo bed 80 includes a latching mechanism 84 for engaging cargo bed sub-frame 16. In this example, the latching mechanism has three latches, left and right latch plates 84A and 84B and forward latch plate 84C. Left and right latch plates 84A and 84B are adapted to receive pins 16A2 and 16B2 extending laterally from the back end of cargo bed sub-frame 16 when cargo bed 80 is slid forward onto sub-frame 16. Forward latch plate 84C is oriented vertically and has a notch for receiving a generally horizontally oriented actuator plate 406 which is associated with dump mechanism 400 and which will be described in greater detail below. When a latch mechanism handle 84D is placed in a latching position, latch plate 84C engages actuator plate 406 and latch plates 84A and 84B capture and receive pins 16A2 and 16B2 thus securing cargo-bed 80 to cargo sub-frame 16.

A particularly useful feature of this cargo bed system is that cargo bed 80 may be tilted to the dumping position shown in FIG. 8 even when cargo bed 80 is not in the transport position shown in FIG. 1. For example, cargo bed 80 may be tilted to dump its contents when translation mechanism 10 is in the raised position shown in FIG. 10. This capability would be useful for dumping cargo bed contents over an obstacle into an enclosed area or into the bed of another vehicle such as a pick-up truck. As can be best seen in FIGS. 8 and 9, a dump mechanism 400, mounted to cargo bed sub-frame 16 operates to tilt cargo bed 80 from a cargo hauling position shown in FIG. 1 to a raised cargo dumping position shown in FIG. 8. Dump mechanism 400 includes an actuator 402 that moves between a retracted position shown in FIG. 7 and an extended position shown in FIG. 8. Actuator 402 in this example is a hydraulic cylinder including a drive rod 402D. As can be best seen in FIG. 7, the proximate end of actuator 402 is pivotably mounted for rotation about axis G to the distal ends of a pair of members that extend away from transverse tube 16C. Transverse tube 16C, as noted above, pivots about axis F. A pair of straps 402A and 402B pivotably engage the proximate end of actuator 402 for rotation about axis G and slidably engage end shaft 12D of rear pivot frame 12. A second pair of straps 406A and 406B shown in FIG. 7 which are pivotably mounted to sub-frame 16 for rotation about axis E laterally stabilize actuator plate 406 which is mounted to the end of drive rod 402D of actuator 402. Thus, as drive rod 402D of actuator 402 extends, the proximate end of actuator 402 drops as tube 16C rotates counter clockwise as viewed from the vantage point of FIG. 7. This provides leverage for actuator 402 as it continues to extend. Thus, as drive rod 402D of actuator 402 continues to extend, actuator plate 406 is raised which causes cargo bed 80 to pivot about axis E between the level cargo hauling position of FIG. 1 to the tilted cargo dumping position shown in FIGS. 5, 6 and 8.

In this embodiment, a "cargo bed" is merely one of number of useful structures that can be mounted to cargo bed sub-frame 16. For example, cargo bed 80 could be replaced by a unit for drilling fence post holes, or a unit having a tank for distributing fertilizer liquids, or an extendable scaffold structure having a scissors lift for use in construction. Thus the term "cargo bed" could be equated with a more general term such as "utility apparatus". Cargo bed 80 is adapted to be an interchangeable unit having standard mounting provisions for attaching to a cargo bed sub-frame as described above. Thus, cargo bed 80 may be interchanged with other cargo beds of the same configuration or even other cargo beds of different configurations adapted for specialized purposes. For example, one cargo bed may be designed for carrying lawnmowers or landscaping tools while another cargo bed may have a specialized design for carrying bulk materials such as mulch or soil. Still another cargo bed may be designed to carry brush or tree branches or any other form of carrier for general hauling or for specialized tasks. Accordingly, a family including a multitude of "cargo attachments" may be developed for use with cargo bed sub-frame 82.

Figure 3:
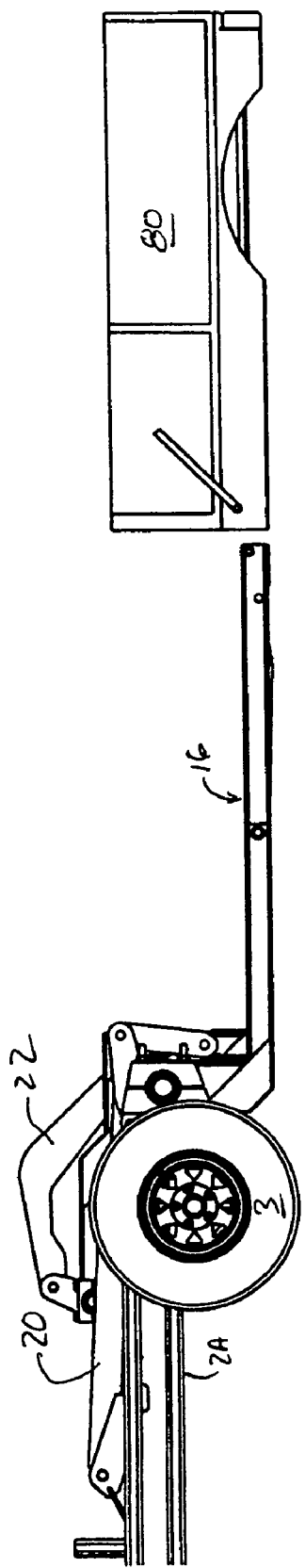
FIG. 3 is a side view of the rear portion of a vehicle with a cargo bed translation mechanism in a loading position and with the cargo bed separated from the cargo bed sub-frame.
Figure 4:
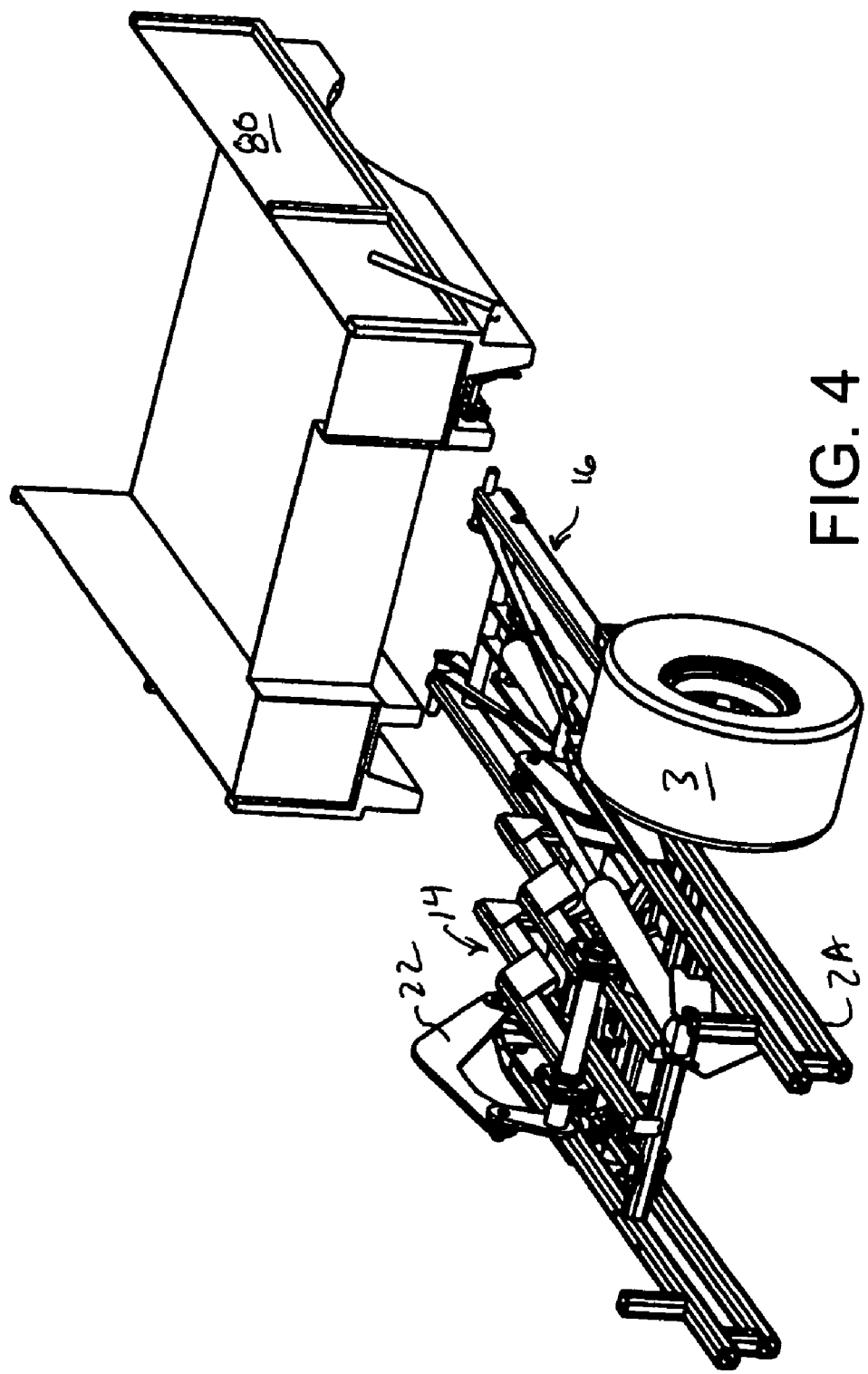
FIG. 4 is a perspective view of the rear portion of a vehicle with a cargo bed translation mechanism in a loading position and with the cargo bed separated from the cargo bed sub-frame.
Figure 5:
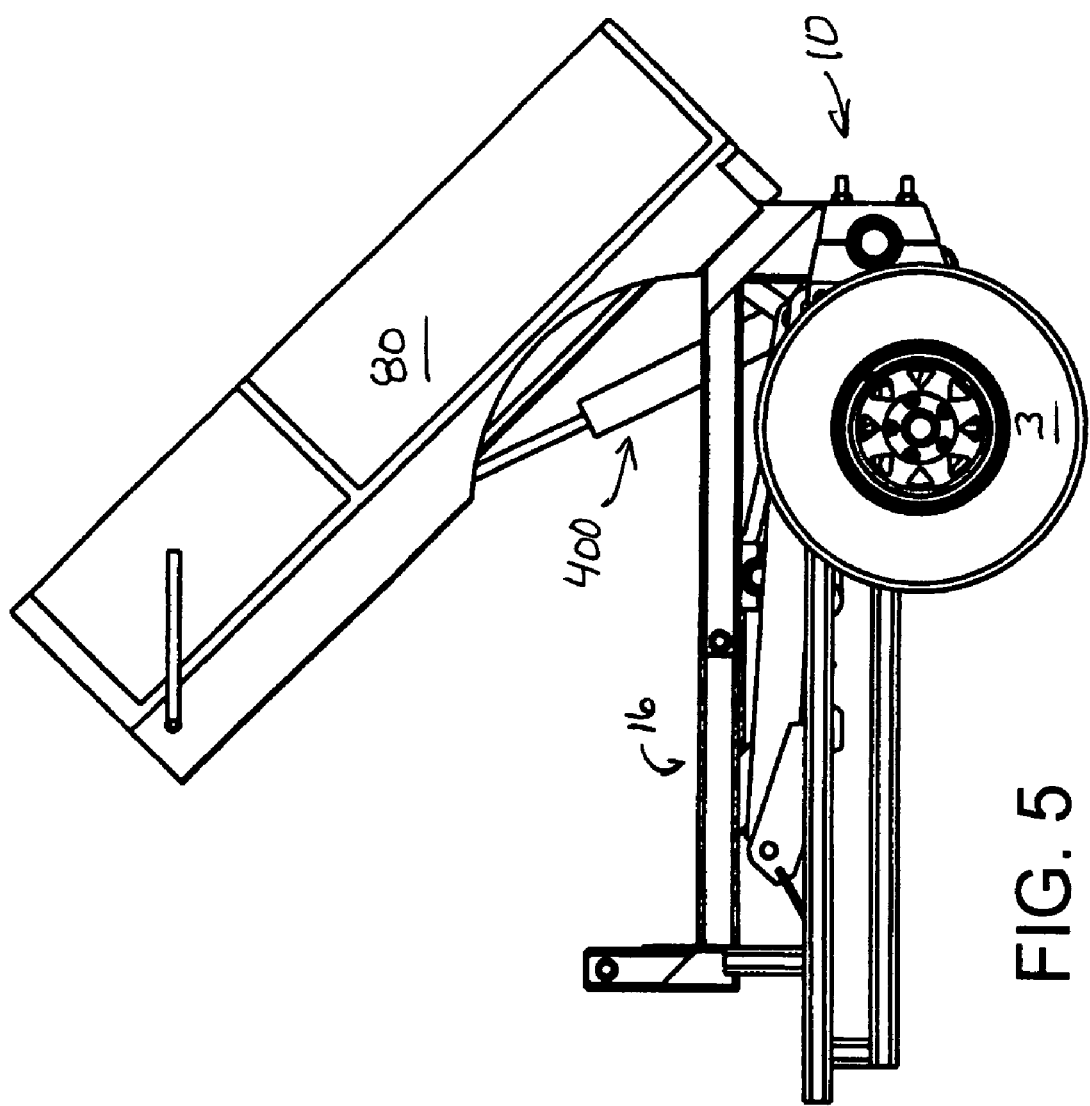
FIG. 5 is a side view showing the cargo bed translation mechanism in a transport position and with the cargo bed tilted in a dumping position.
Figure 6:
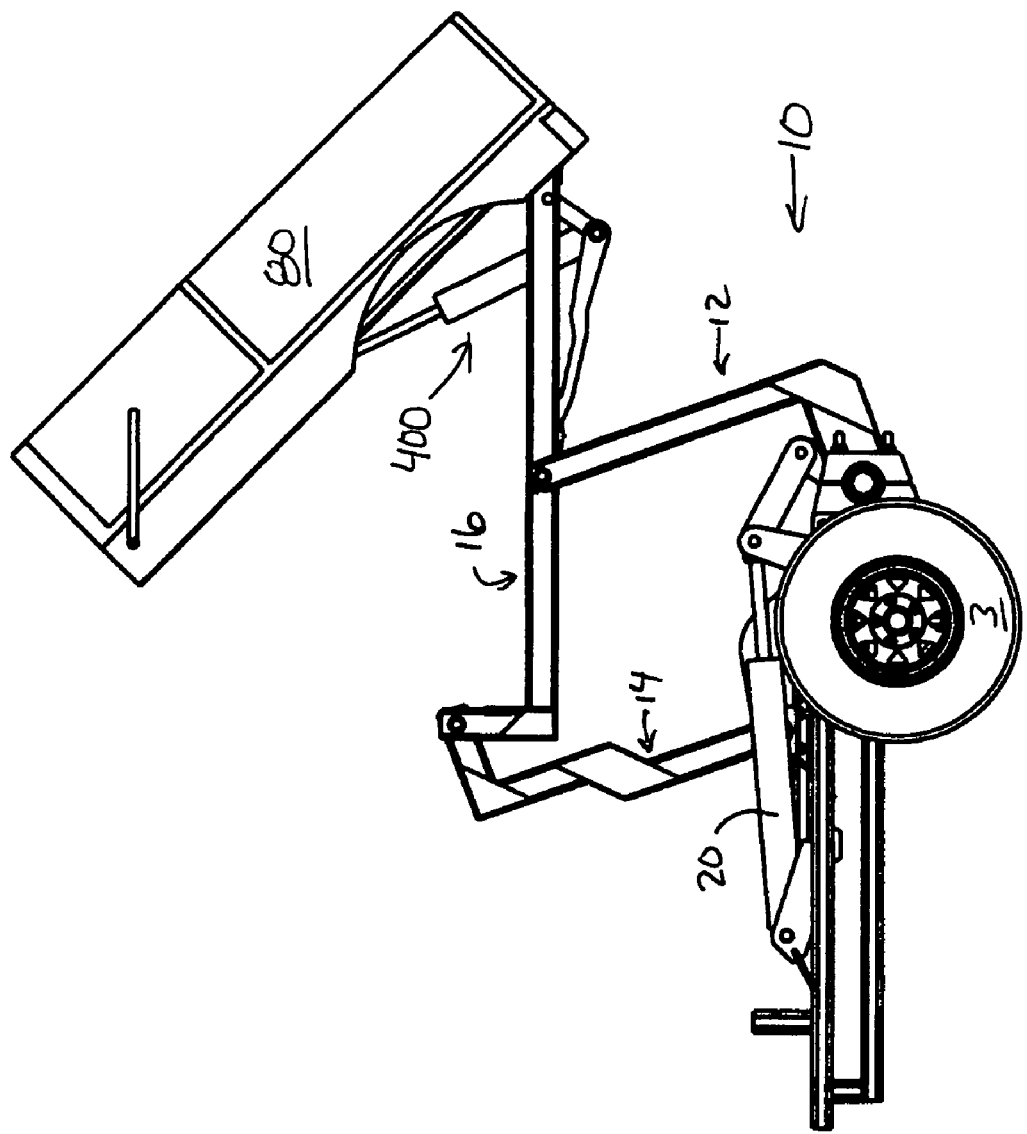
FIG. 6 is a side view of the cargo bed translation mechanism wherein the cargo bed support frame is elevated to the highest position and the cargo bed tilted up in a dumping position.

The above described mechanism provide a number of capabilities for use by the operator of a vehicle having a cargo bed. When translation mechanism 10 is in a fully raised position as shown in FIG. 6 and when cargo bed 80 is fully tilted as shown in FIG. 6, it may be possible to unload bulk material to be received by an elevated container or vehicle. Because cargo bed 80 may be translated to a loading position as shown in FIG. 2 and then released as shown in FIG. 3, it is possible for an operator to use the front end of vehicle 2, if it is equipped with a material moving blade or bucket, to push material into cargo bed 80 and then pick up cargo bed 80 for transport. Still further, because cargo bed 80 may be released as shown in FIG. 3, it becomes possible for an operator to deliver a cargo bed to a location and to pick up a cargo bed from a location. This can be done to distribute, pick up or relocate items as needed, for example, in a grounds keeping operation. Accordingly, with the capabilities described above, a vehicle becomes highly productive and versatile.

Figure 13:
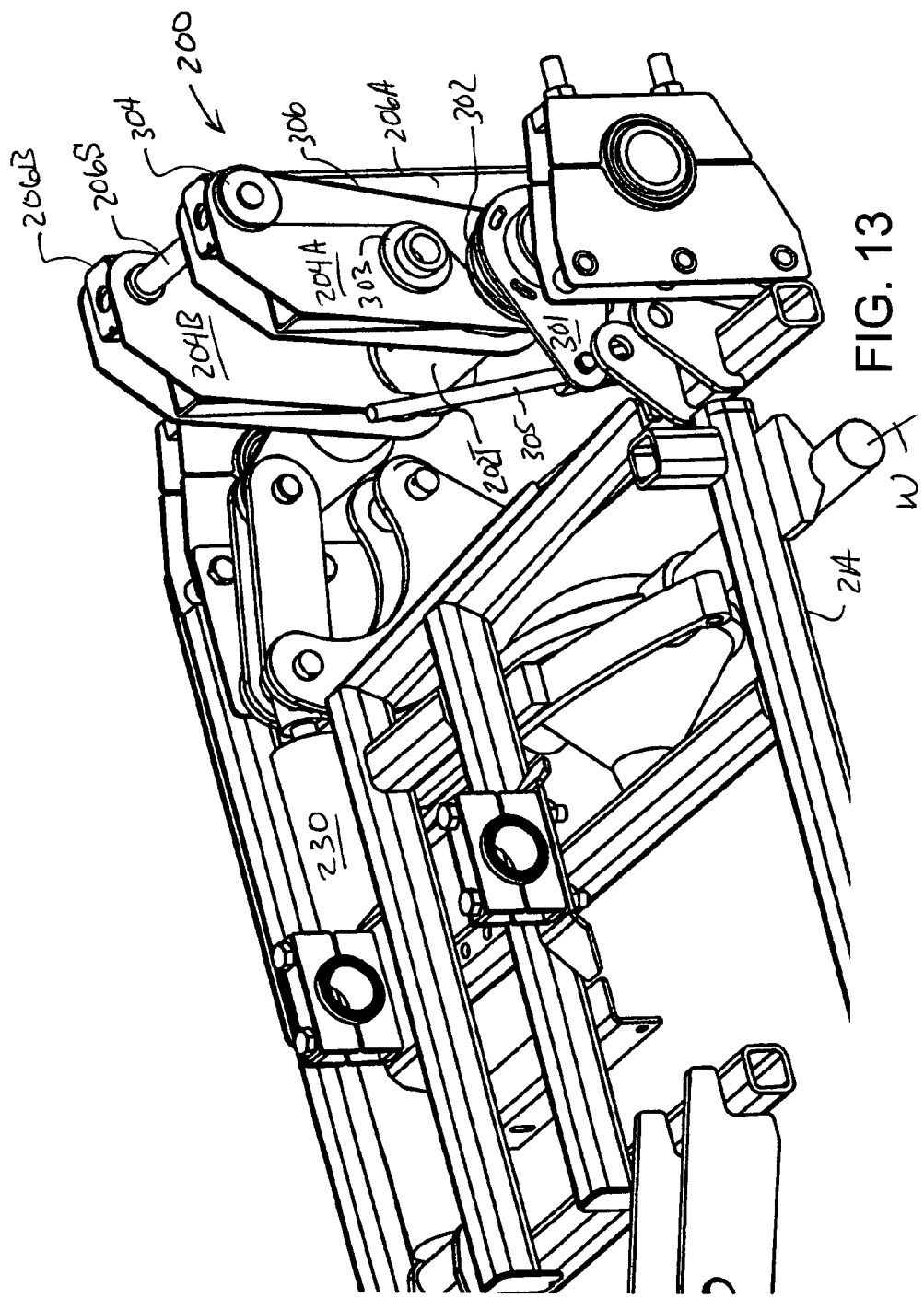
FIG. 13 is a perspective view showing an outrigger assembly mounted to a vehicle frame wherein the outrigger assembly is in the stowed position.
Figure 14:
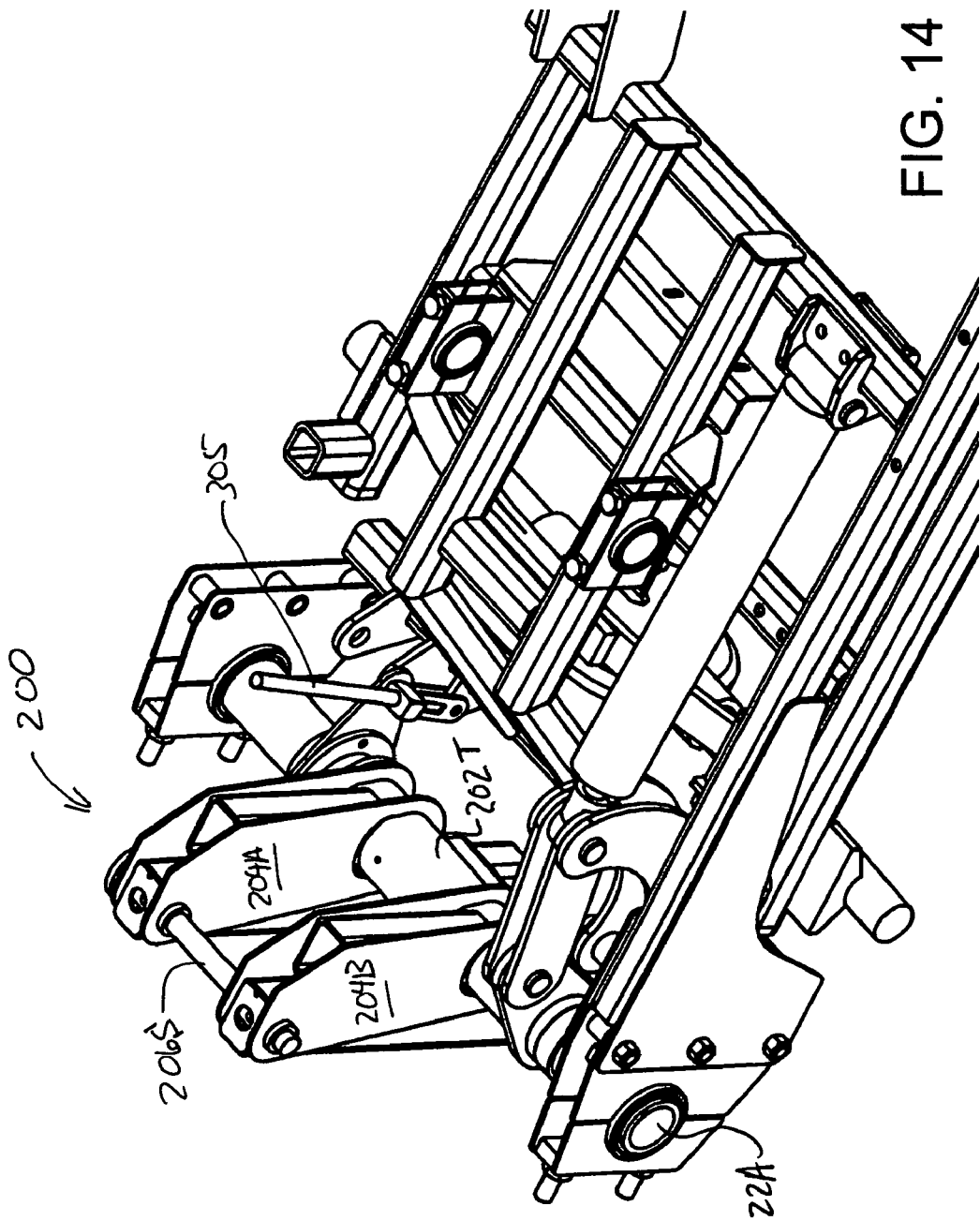
FIG. 14 is a side view showing an outrigger assembly in the stowed position with most of the vehicle frame removed for clarity.
Figure 15:
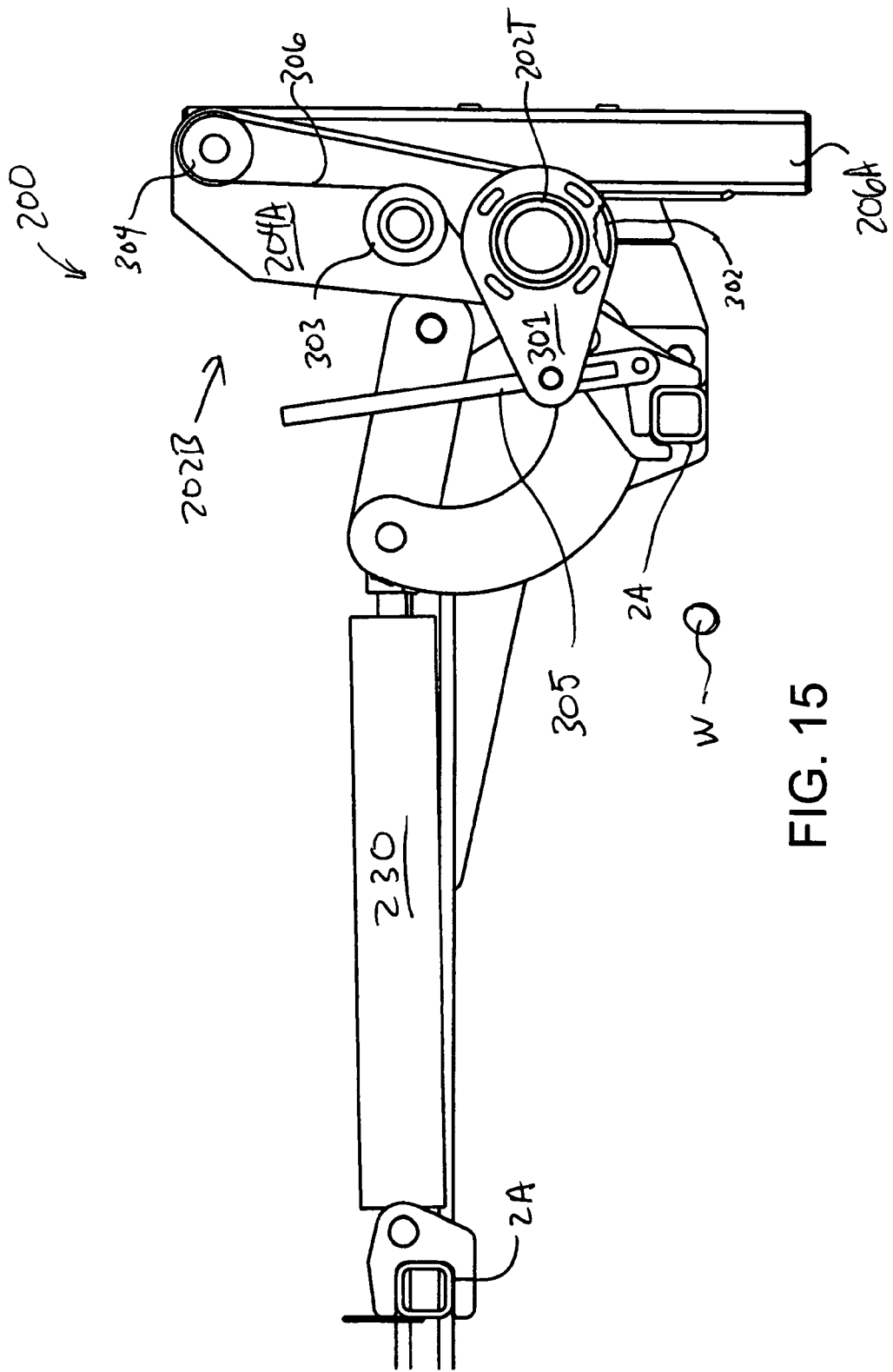
FIG. 15 is a side view showing an outrigger assembly in a first partially extended position with most of the vehicle frame removed for clarity.
Figure 16:
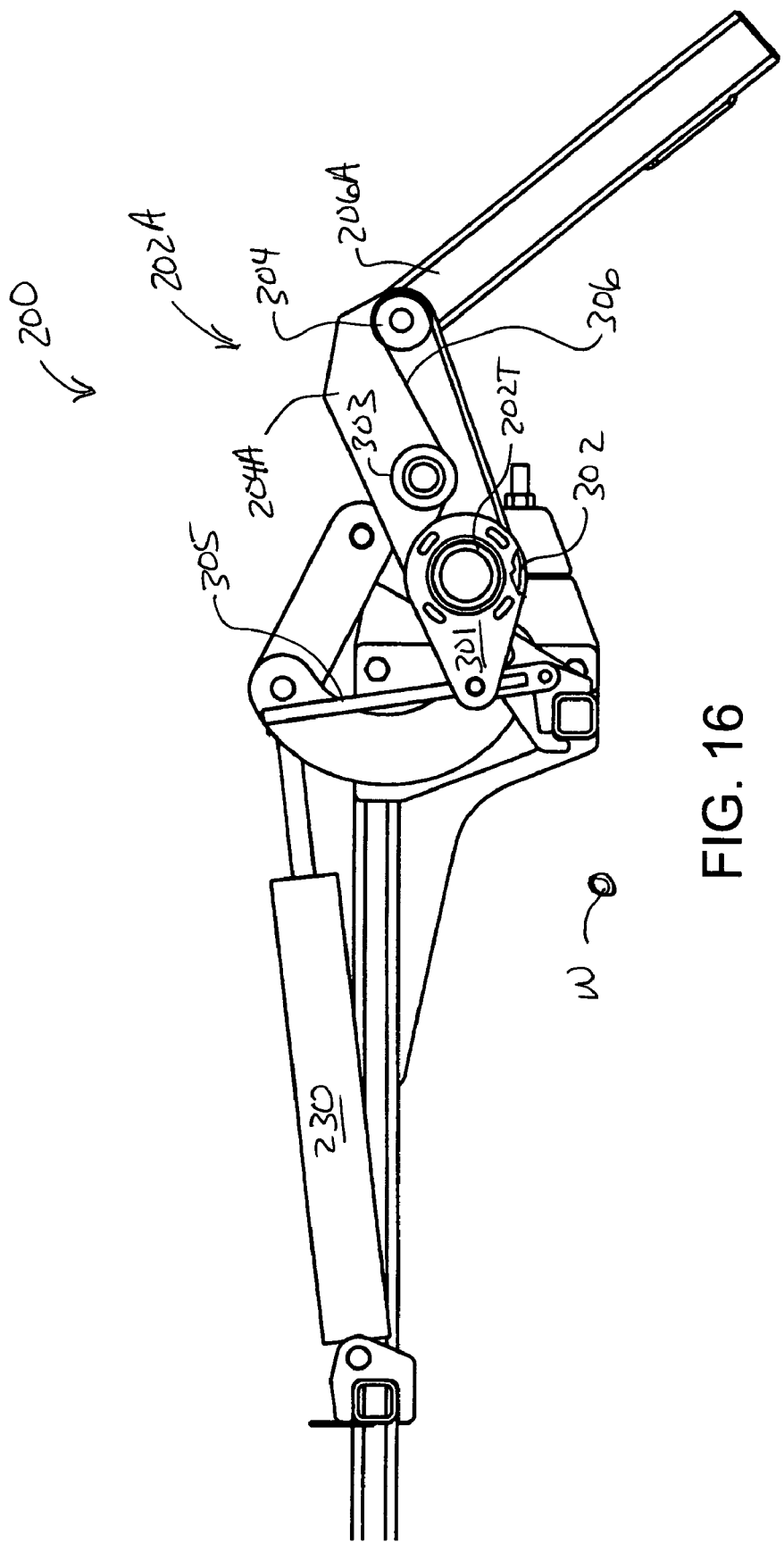
FIG. 16 is a side view showing an outrigger assembly in a second partially extended position with most of the vehicle frame removed for clarity.
Figure 17:
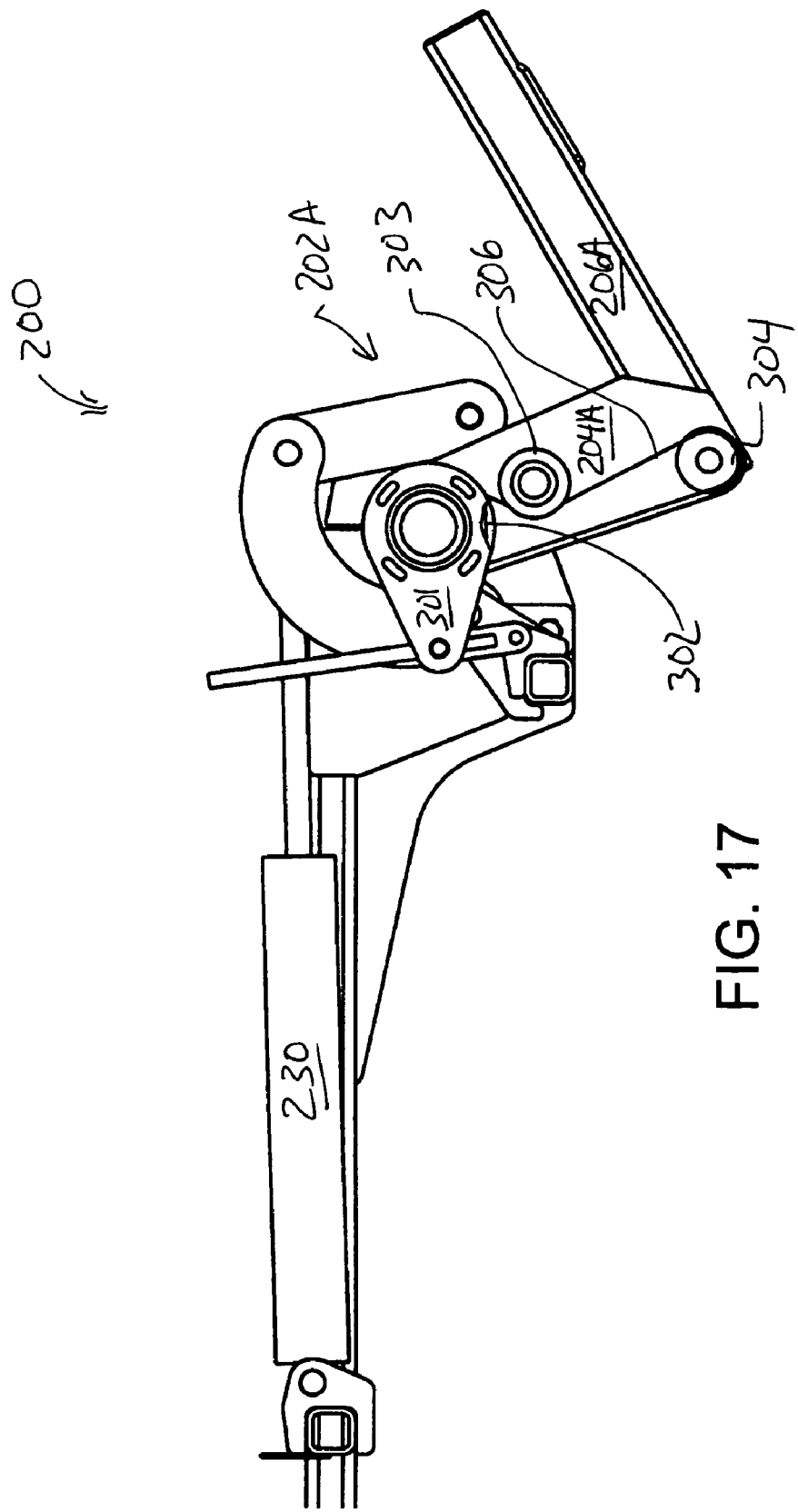
FIG. 17 is a side view showing an outrigger assembly in a third partially extended position wherein the foot member is fully extended relative to the support leg.
Figure 18:
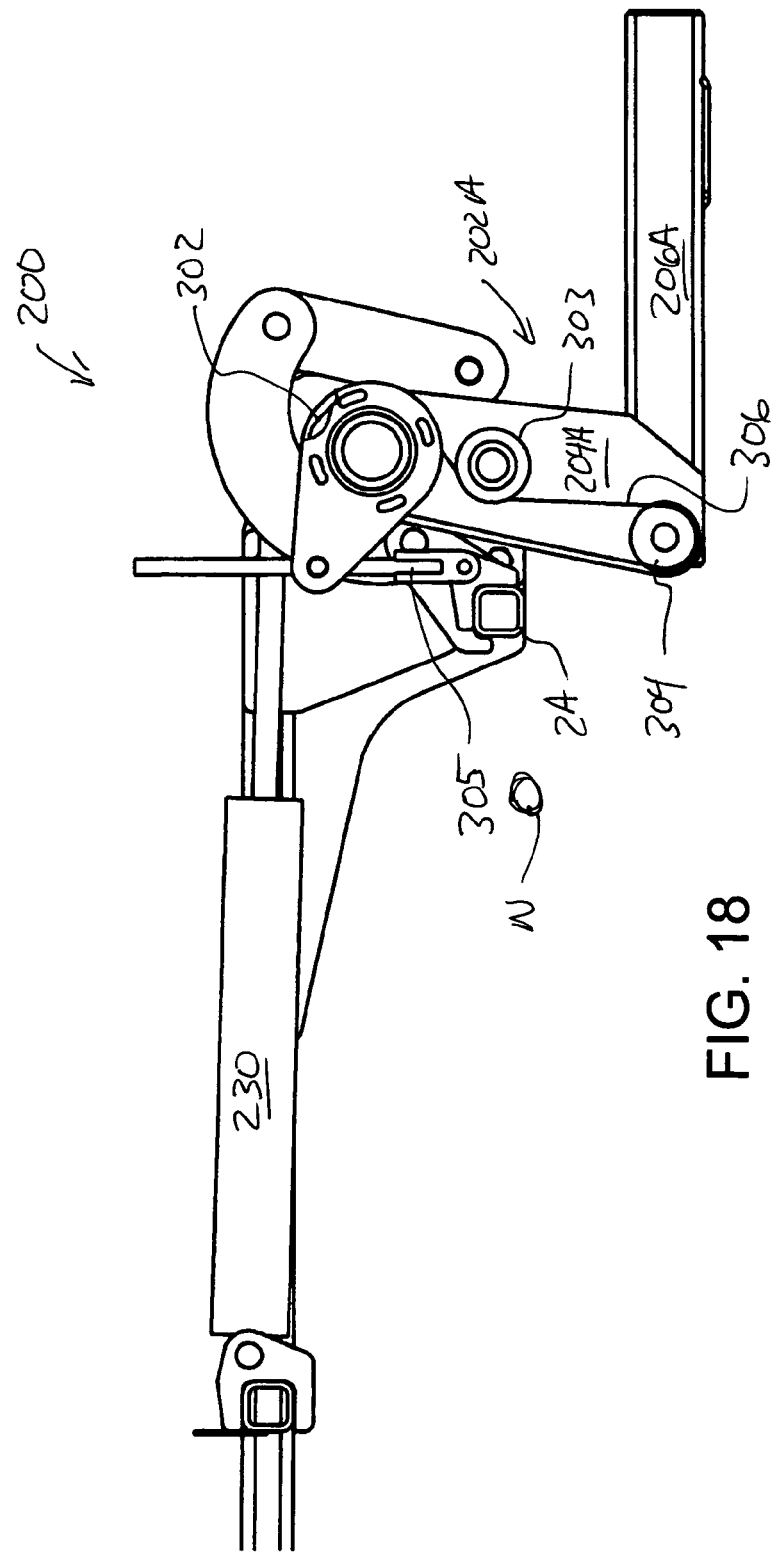
FIG. 18 is a side view showing an outrigger assembly in a fully deployed position.

If cargo-bed 80 is heavily loaded when it translated to a rearwardly extended position as shown in FIG. 2, the possibility exists that the combined center of gravity of the vehicle and cargo-bed 80 may shift to a location behind the axis of wheels 3. This could cause the front end of vehicle 2 to tip up in an unsafe manner. Accordingly, the apparatus optionally includes an outrigger installation 200 which is normally retracted as shown in FIGS. 13 and 14 and which deploys to stabilize the vehicle prior to the cargo-bed moving to a deployed position as shown in FIG. 18. Outrigger installation 200 is an example solution for stabilizing vehicle 2 when its center of gravity shifts to the rear of the vehicle. Those skilled in the art will readily appreciate how a number of various deployable structures may be employed to stabilize the back end of vehicle 2. Outrigger installation 200 is shown in FIGS. 13-18. As can be seen in FIG. 14, outrigger installation 200 is mounted to the back end of vehicle 2 behind axle W. As can be seen in FIG. 13, outrigger installation 200 includes two generally identical outrigger assemblies 202A and 202B.

Outrigger installation 200 may be better understood by considering one of the two generally identical outrigger assemblies 202A and 202B. Outrigger assemblies 202A and 202B are fixed to an outrigger tube 202T which is, in turn, rotatably carried by shaft 22A. Thus, for ease of illustration, we will consider outrigger assembly 202A while remembering that what is said about outrigger assembly 202A is also true of outrigger assembly 202B. Outrigger assembly 202A includes a leg member 204A and a foot member 206A. Although the operation of outrigger assembly 202A will be described in greater detail below, the skilled reader should understand outrigger installation 200 is arranged so that outrigger assemblies 202A and 202B deploy and retract in unison. Thus we can describe the motion of both outrigger assemblies by considering the motion of outrigger assembly 202A as follows as outrigger assembly deploys from the stowed position shown in FIG. 14 to the deployed position shown in FIG. 18: (a) Leg member 204A rotates in a clockwise direction as viewed in FIG. 14 about its proximate end. Leg member 204A is fixed to outrigger tube 202T which is at least indirectly rotatably mounted to vehicle frame 2A. The rotation of outrigger tube 202T is actuated by actuator 230. (b) As the leg member 204A rotates away from the stowed position, foot member 206A rotates about its proximate end where it is rotatably mounted to the distal end of leg member 204A in a counterclockwise direction as viewed in FIG. 14 from a folded position as shown in FIG. 14 to an extended position shown in FIG. 18, and, foot member 206A preferably completes its rotation relative to leg member 204A and reaches its extended position relative to leg member 204A substantially before leg member 204A completes its rotation to its deployed position.

Outrigger assembly 202A is able to fold up into a relatively small volume as shown in FIG. 14 because leg member 204A has an open U shaped channel which is adapted for receiving foot member 206A. The center flange of the U shaped channel of leg member 204A is offset from the distal end of leg member 204A in order to present an recessed edge that engages foot member 206A when foot member 206A reaches the extended position shown in FIG. 18 thereby. This makes it possible for outrigger assembly 202A, when in the deployed position shown in FIG. 18, to function as a rigid load transferring support for stabilizing the vehicle should the center of gravity shift behind the rear wheels of the vehicle as described above.

Outrigger assemblies 202A and 202B are fixed to a transverse tube 202T which is, in turn, rotatably carried by transverse shaft 22A for simultaneous motion. We will describe the mechanism associated with outrigger assembly 202A which regulates the timing of the relative motions of leg member 204A and foot member 206A as outrigger assembly 202A moves from the stowed position to the deployed position. The following description is undertaken from the vantage point of FIGS. 14-18 which is the vantage point of an observer positioned away from the vehicle on the left side. The deploying motion of outrigger assembly 202A is actuated by the rotation of tube 202T. The rotation of tube 202T may be powered by any one of a number of types of actuators. In this example, a hydraulic cylinder 230 connects between vehicle frame 2A and a linkage 240 fixed to tube 202T. Thus, tube 202T rotates between a first position corresponding to the stowed position for outrigger installation 200 as shown in FIG. 14 and a second position corresponding to a deployed position for outrigger installation 200 as shown in FIG. 18.

The timing of the relative motion between leg member 204A and foot member 206A is regulated by a timing mechanism 300 which is mounted to outrigger assembly 200A and connected by a shaft 206S to outrigger assembly 200B on the opposite side of outrigger installation 200. Timing mechanism 300 includes a sprocket lobe 301, a first sprocket 302, a second sprocket 304, an endless timing chain 306 connecting between first sprocket 302 and second sprocket 304 and an idler sprocket 303. Idler sprocket 303, which is optional, is rotatably mounted to leg member 204A and functions to restrict timing chain 306 to a smaller volume. Sprocket lobe 301 is rotatably mounted to transverse tube 202T but is spring biased in a counterclockwise direction against a stationary stop by a spring assembly 305 in the position shown in FIG. 14. First sprocket 302 is fixed to sprocket lobe 301. Second sprocket 304 is fixed to the proximate end of foot member 206A. A shaft 206S which can be most easily seen in FIG. 13 is fixed to second sprocket 304 (and foot member 206A) and extends to the opposite side of outrigger installation 200 where it is fixed to the opposite foot member 206B of outrigger assembly 202B. With these relationships in mind, it is possible to determine the relative motion between leg member 204A and foot member 206A as tube 202T, to which leg member 204A is fixed, is rotated clockwise by actuator 230 (See FIGS. 14-18). As leg member 204A rotates clockwise, first sprocket 302 remains stationary with respect to frame 2A. This causes second sprocket 304 to rotate relative to leg member 204A as leg member 204A rotates about its proximate end. Since second sprocket 304 is fixed to the proximate end of foot member 206A, foot member 206A rotates in an opposite counter clockwise direction with respect to the distal end of leg member 204A as leg member 204A rotates clockwise. Because second sprocket 304 is substantially smaller than first sprocket 302, foot member 206A rotates at a higher rate than leg member 204A. Accordingly, as demonstrated in FIG. 17, leg member 204A has rotated approximately 160 degrees clockwise with respect to vehicle frame 2A while foot member 206A has rotated approximately 270 degrees counterclockwise with respect to foot member 204A. FIG. 17 shows the configuration of outrigger assembly 202A at the instant when foot member 206A has come in contact with the recessed edge of the center flange of leg member 204A. When foot member 206A thus contacts leg member 204A, second sprocket 304 stops rotating which in turn stops the movement of sprocket chain 306 as leg member 204A and foot member 206A continue to rotate as a unit to the position shown in FIG. 18. As the rotation of as leg member 204A and foot member 206A proceeds to the deployed position shown in FIG. 18, sprocket chain 306 forces the rotation of first sprocket 302 and sprocket lobe 300 which is fixed to sprocket 302 to rotate clockwise relative to vehicle frame 2A against the bias of spring member 305. As can be seen in FIG. 18, spring member 305 is deflected and sprocket lobe 300 has been rotated with respect to vehicle frame 2A in the clockwise direction by an angle corresponding to the angle of rotation of leg member 204A occurring between FIGS. 17 and 18.

Figure 19:
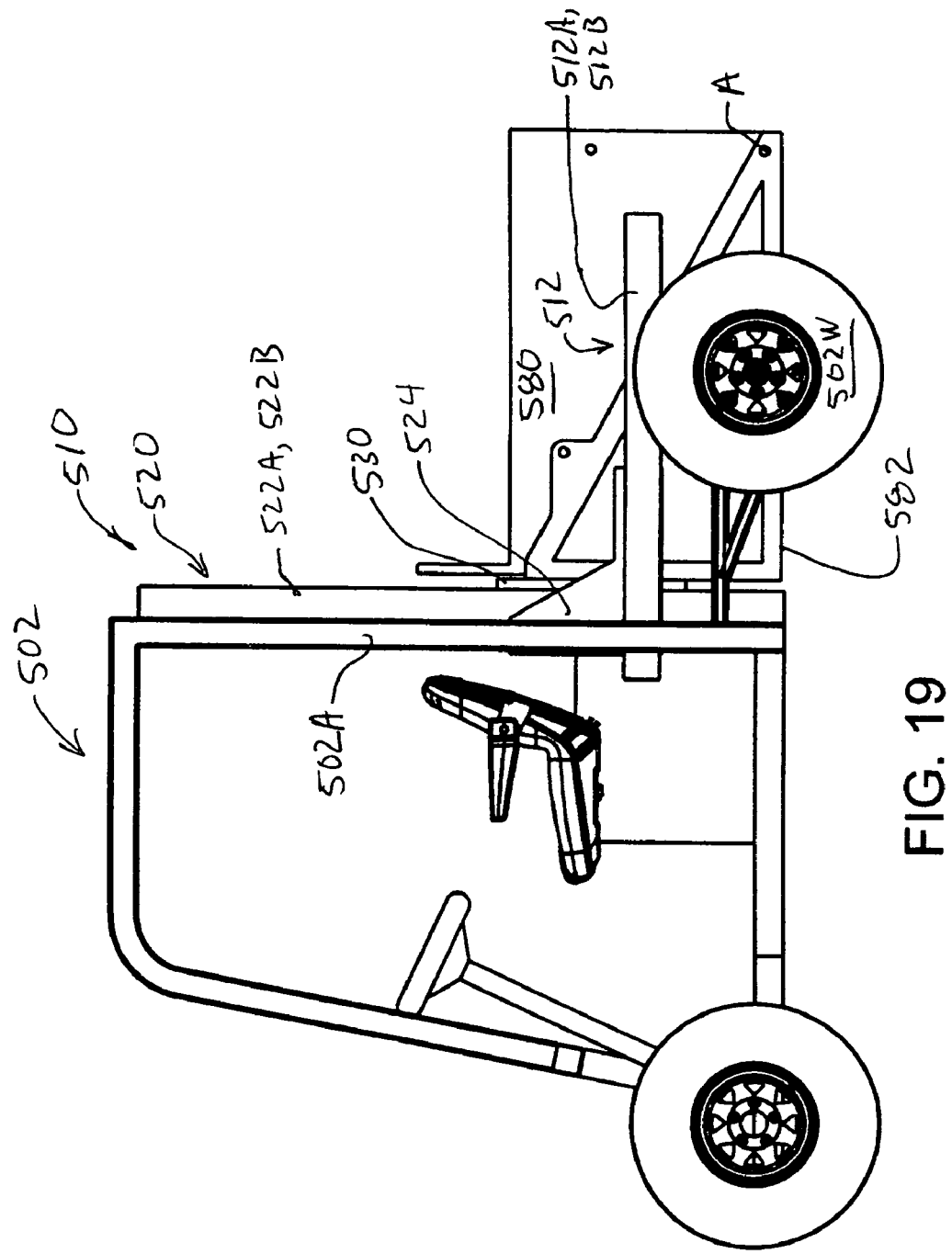
FIG. 19 is a side view showing a second embodiment of a translating cargo bed with the cargo bed in a transport position.

FIGS. 19-24 illustrate a second embodiment for a translation mechanism. As can be seen in FIG. 19, translation mechanism 510 is mounted to vehicle 502 having a vehicle frame 502A and generally includes a horizontal rail assembly 512, a mast assembly 520 and a cargo bed 580. In practice, horizontal rail assembly 512 and mast assembly 520 preferably include left and right rails or members as will be described in greater detail below. However, for simplicity, the description below may describe one side of the installation to teach the structure and function of the installation's components.

Figure 22:
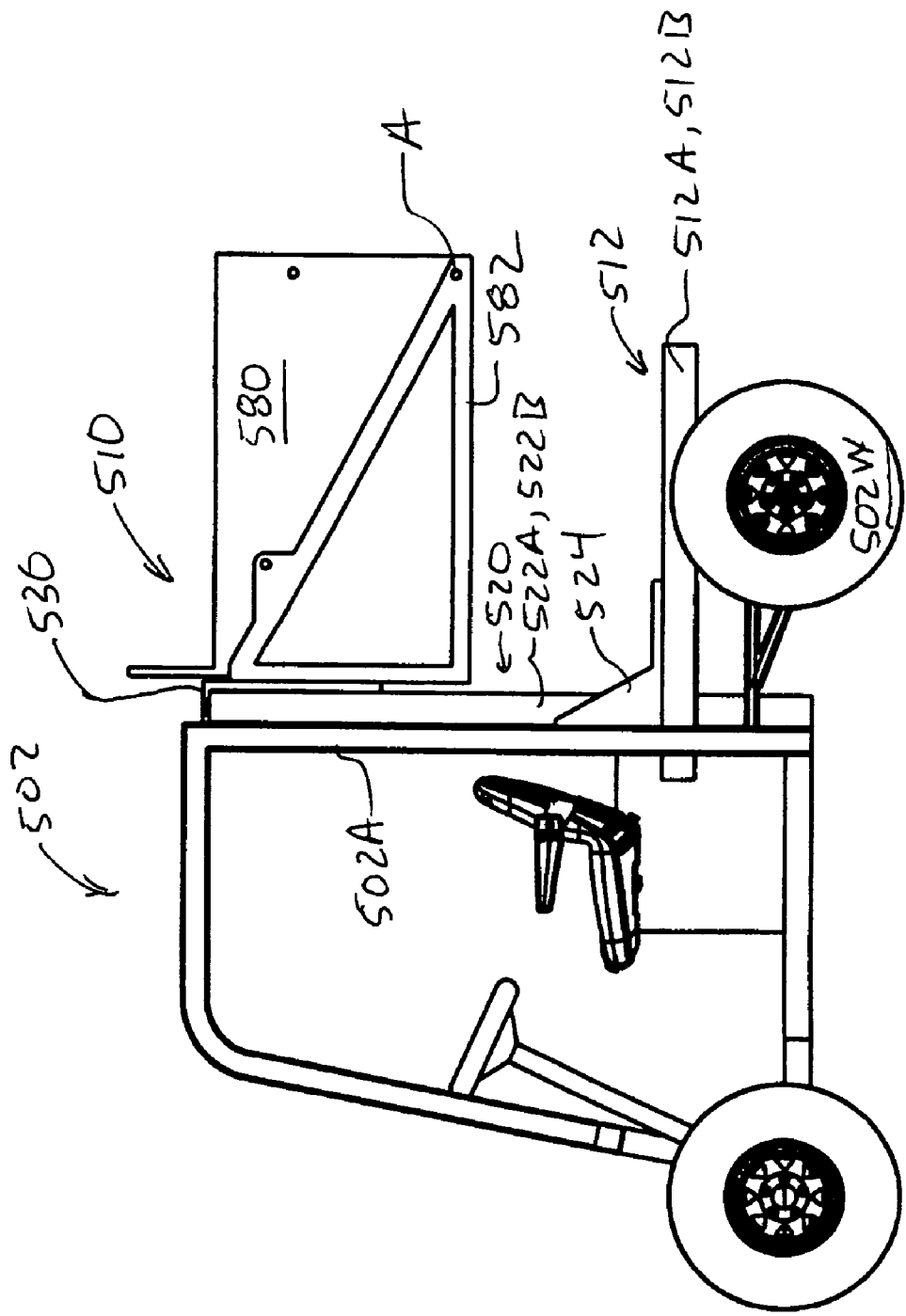
FIG. 22 is a side view showing a second embodiment of a translating cargo bed with the cargo bed in a raised position.
Figure 23:
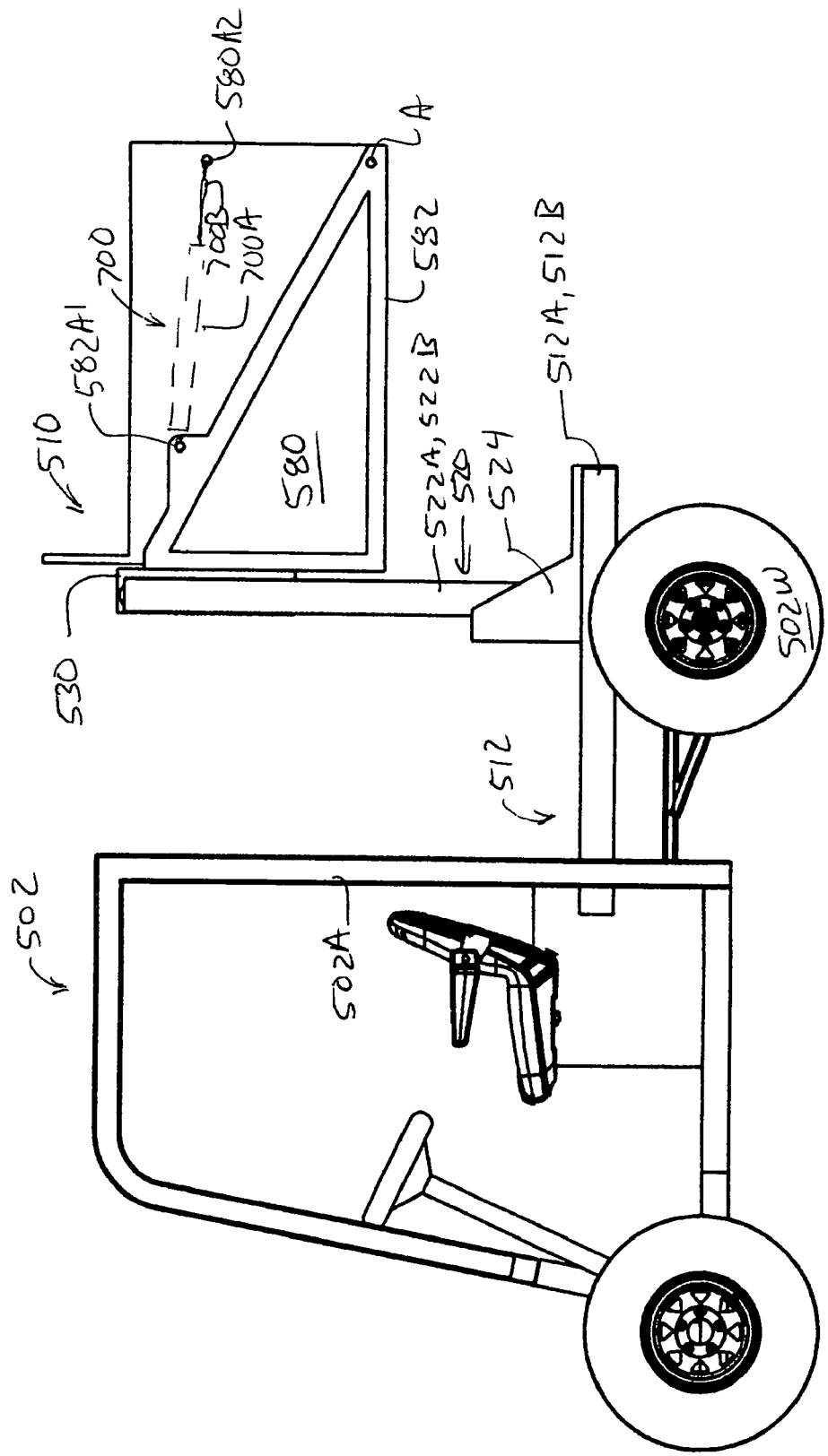
FIG. 23 is a side view showing a second embodiment of a translating cargo bed with the cargo bed in a raised rearward position.

A horizontal carriage assembly 524 carries mast assembly 520 and moves horizontally along rails 512A and 512B through a range of motion between the forward position shown in FIG. 22 and the rearward position shown in FIG. 23. Horizontal rail assembly 512, in this example, includes two parallel, spaced generally horizontal rails 512A and 512B. Mast assembly 520, in this example, includes two parallel upright mast rails 522A and 522B which are spaced sufficiently close to each other so that they can move between horizontal rails 512A and 512B of horizontal rail assembly 512 while moving between the forward position shown in FIG. 22 and the rearward position shown in FIG. 23. Horizontal carriage assembly 524 may employ powered rollers for engaging rails 512A and 512B, or powered gear wheels which engage linear racks disposed on one of the surfaces of one of or both of rails 512A and 512B or some other appropriate means well known by those skilled in the art for effecting low friction, powered controllable linear movement.

Figure 24:
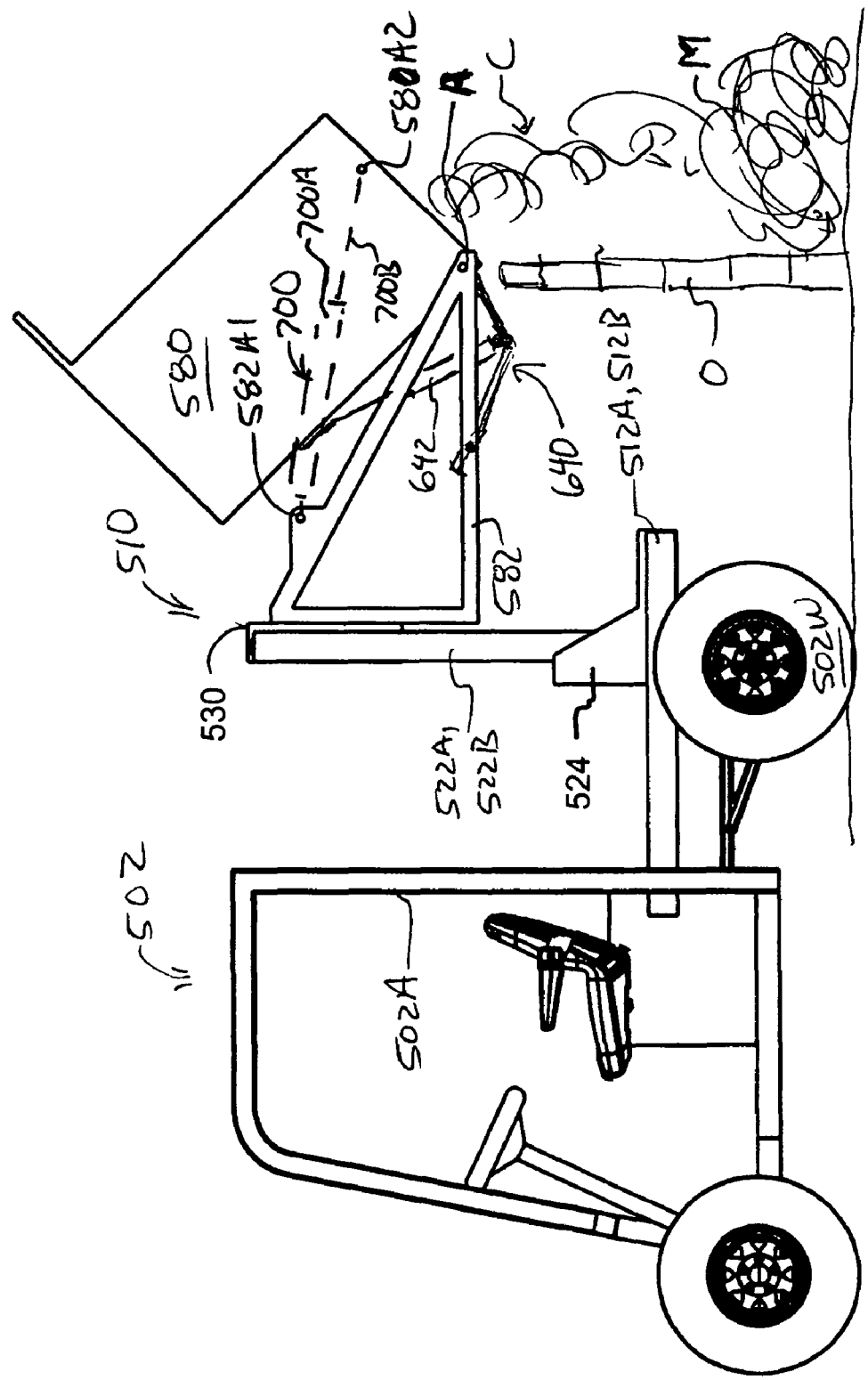
FIG. 24 is a side view showing a second embodiment of a translating cargo bed with the cargo bed in a raised rearward position with a cargo bed dump mechanism in an extended position so that the cargo bed is tilted up for dumping materials from the cargo bed suitable for dumping materials over a raised obstacle or on to a pile.

Cargo bed 580 is carried by a cargo bed sub-frame 582. Cargo bed 580 is pivotably mounted to cargo bed sub-frame 582 to rotate about axis A between a level hauling position shown in FIG. 23 through a range of motion to a tilted dumping position shown in FIG. 24. As can be seen in FIG. 24, a dump mechanism 640 is employed to power the tilting motion of cargo bed 580. Dump mechanism 640 may preferably be arranged very similarly to dump mechanism 400 described above.

Figure 20:
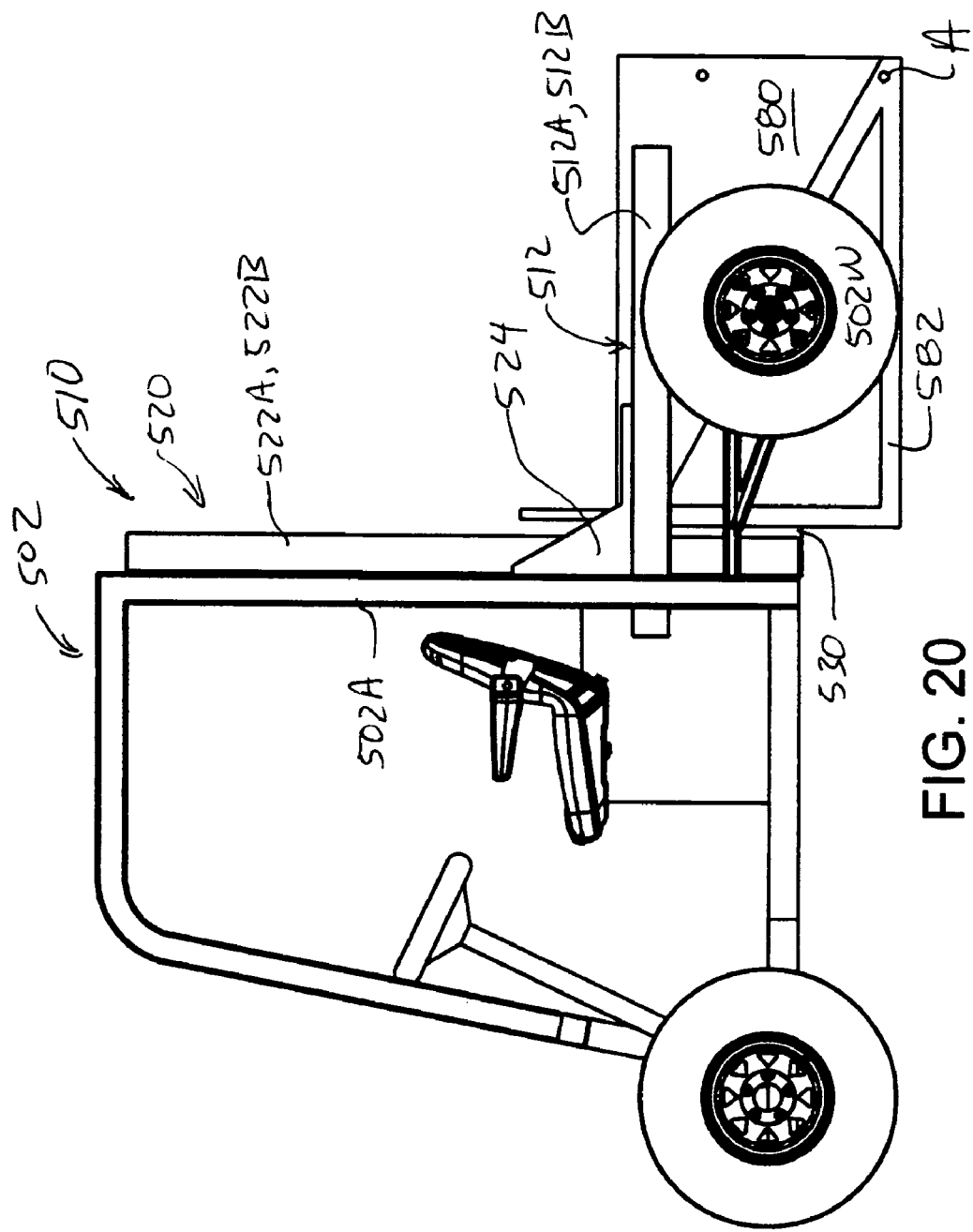
FIG. 20 is a side view showing a second embodiment of a translating cargo bed with the cargo bed in a lowered position.

Cargo bed sub-frame 582 is, in turn, mounted to a vertical carriage assembly 530 which makes it possible to translate cargo bed sub-frame 582 and cargo bed 580 up and down in a range of motion including a lowered position shown in FIG. 20 and a raised position shown in FIG. 22. Vertical carriage assembly 530 is mounted to upright mast rails 522A and 522B of mast assembly 520 and is adapted for powered controlled movement up and down mast rails 522A and 522B. The skilled reader should bear in mind only vertical motion is discussed in this connection. When this vertical range of motion is combined with the horizontal range of motion described above, cargo bed 80 may be translated to any position within an envelope E shown in FIG. 21. In order to accommodate this range of motion, in this example, the space between rear wheels 502W and rails 512A and 512B is open to accommodate upright mast rails 522A and 522B and at least the lower portions cargo bed 580 and cargo bed sub-frame 582.

Figure 21:
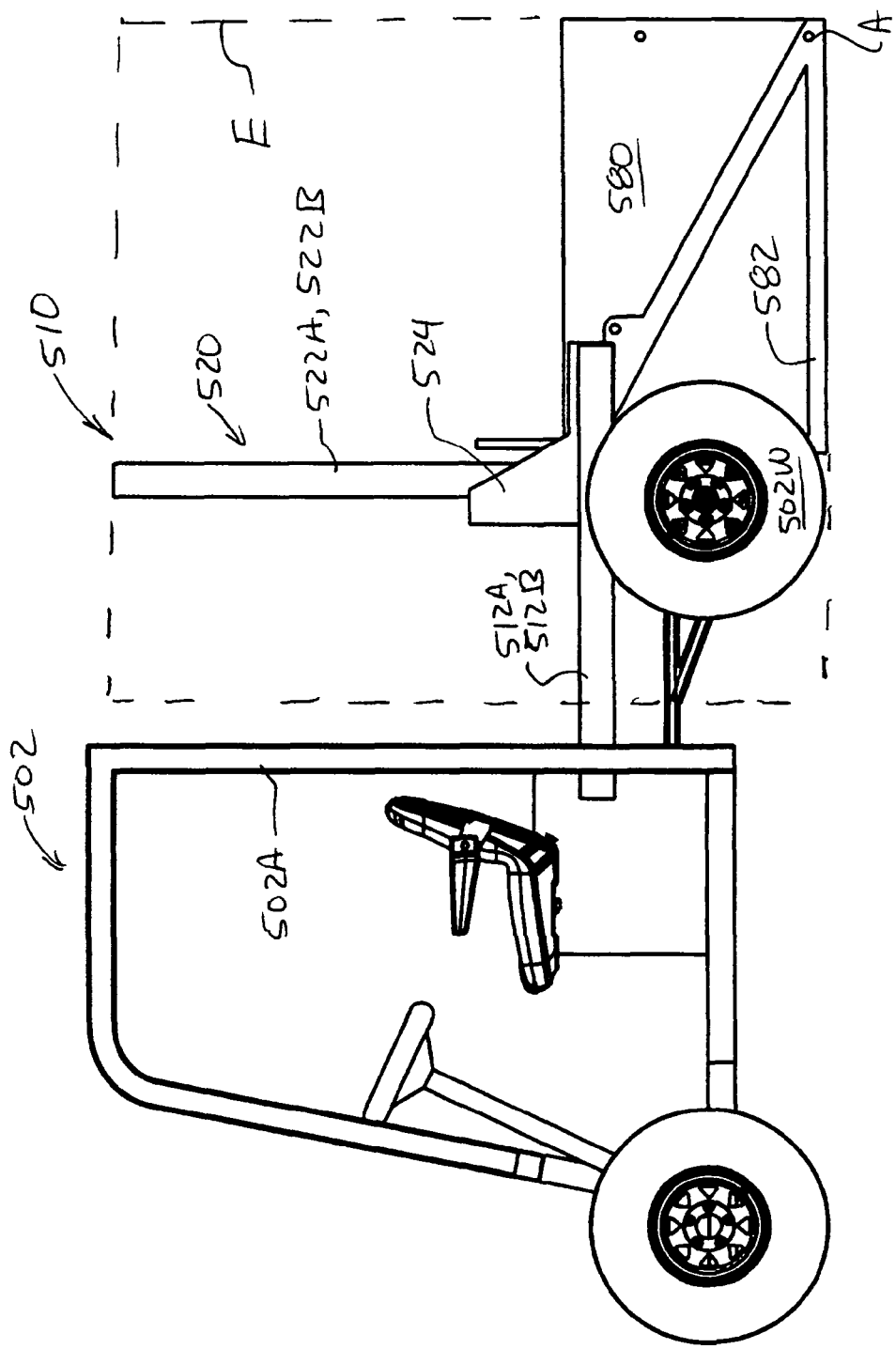
FIG. 21 is a side view showing a second embodiment of a translating cargo bed with the cargo bed in a rearward lowered position.

Because of the ranges of motions of translating mast assembly 520 and mast shuttle assembly 530, as described above, it is possible to effect any of the following types of motion: (a) raising cargo bed assembly 580 from a transport position shown in FIG. 19 to a raised position shown in FIG. 22. (b) Translating cargo bed 580 and raising cargo bed 580 from a transport position shown in FIG. 19 to an elevated rearwardly extended position shown in FIG. 23. (c) Translating cargo bed 580 from a transport position shown in FIG. 19 to a lowered position shown in FIG. 20. (c) Translating cargo bed 580 from a transport position shown in FIG. 19 to a lowered and rearwardly extended position shown in FIG. 21. Accordingly, an operator may use the modes of movement described above to place cargo bed assembly 580 anywhere in an envelope E as shown in FIG. 21. Moreover, by adding dump mechanism 640 as shown in FIG. 24, it is possible to dump the contents of cargo bed 580 from nearly any position within envelope E including from a raised and rearwardly extended position as shown in FIG. 24. As the skilled reader will observe, FIG. 24 shows contents C of cargo bed 580 being dumped over an obstacle O onto a pile of material M. Cargo bed 580 may be used as a working platform when elevated as shown in FIG. 22 or from other locations within envelope E shown in FIG. 21. Still further, an outrigger assembly such as the one described above may be needed to prevent the combined center of gravity of the vehicle and cargo bed 580 (when loaded) from translating behind the center of rotation of wheel 502W. The skilled reader may also appreciate it may not be possible to operate the dump mechanism shown in FIG. 24 from the loading positions shown in FIGS. 20 and 21 because the dump mechanism can not rotate to provide leverage for actuator 402 when cargo bed sub frame 582 is resting on ground surface in a loading position.

An second optional dump mechanism 700 for actuating the tilting motion of cargo bed 580 is also shown in phantom in FIGS. 23 and 24. Second optional dump mechanism 700 includes an actuator portion 700A which could be a linear actuator or a hydraulic cylinder and a drive rod portion 700B which moves through a range of motion including a retracted position shown in FIG. 23 and an extended position shown in FIG. 24. Dump mechanism 700 connects between an attach point 582A1 of sub-frame 582 and an attach point 580A2 near the back end of cargo bed 580 which is spaced in a vertical direction away from axis A. The connection between drive rod portion 700B and cargo bed attach point 580A2 is preferably releasable so that cargo bed 580 may be removed from cargo bed sub-frame 582 as needed. An advantage of second optional dump mechanism 700 is that it does not interfere with the ground when extended even when sub-frame 582 is at rest on the ground as shown in FIG. 21.

Figure 25:
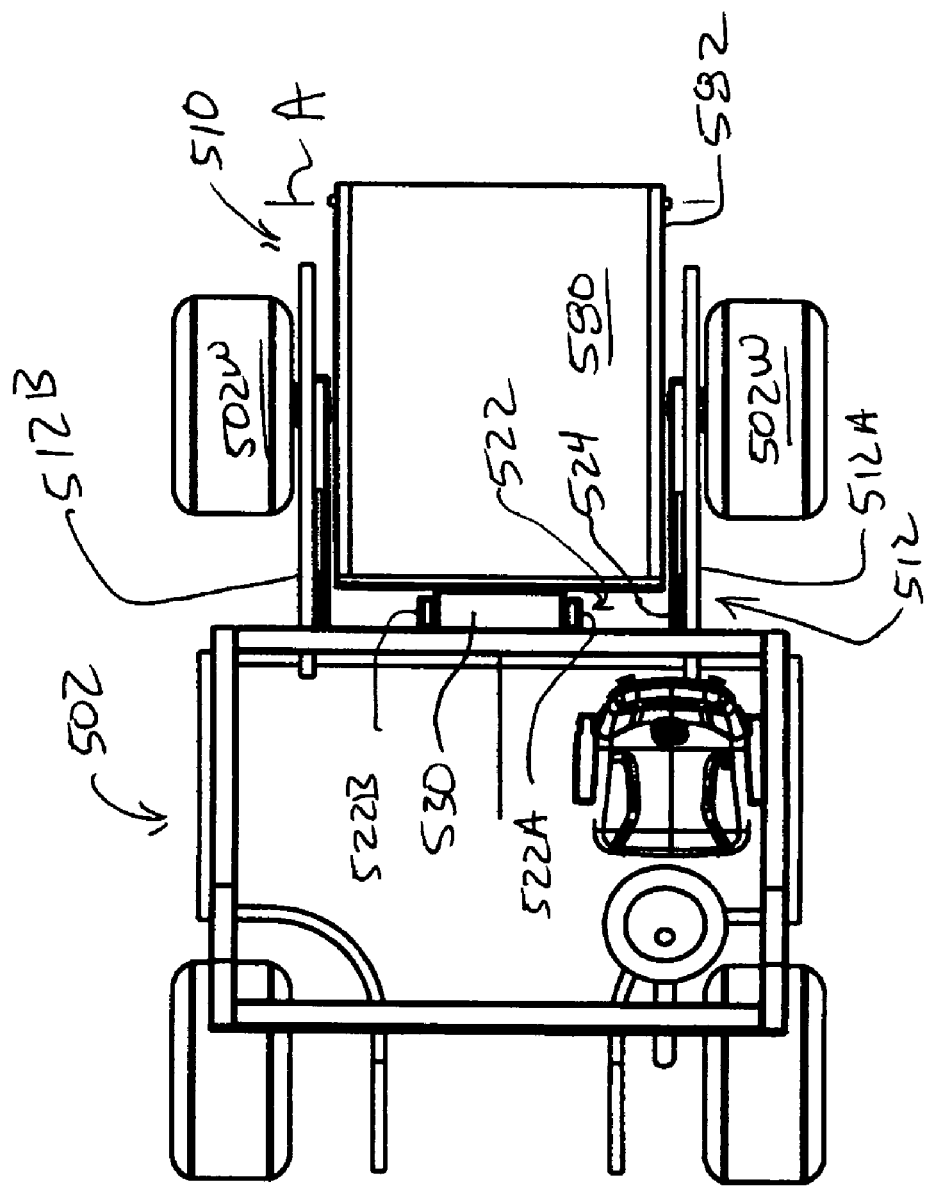
FIG. 25 is a top view showing a second embodiment of a translating cargo bed with the cargo bed in a forward position.
Figure 26:
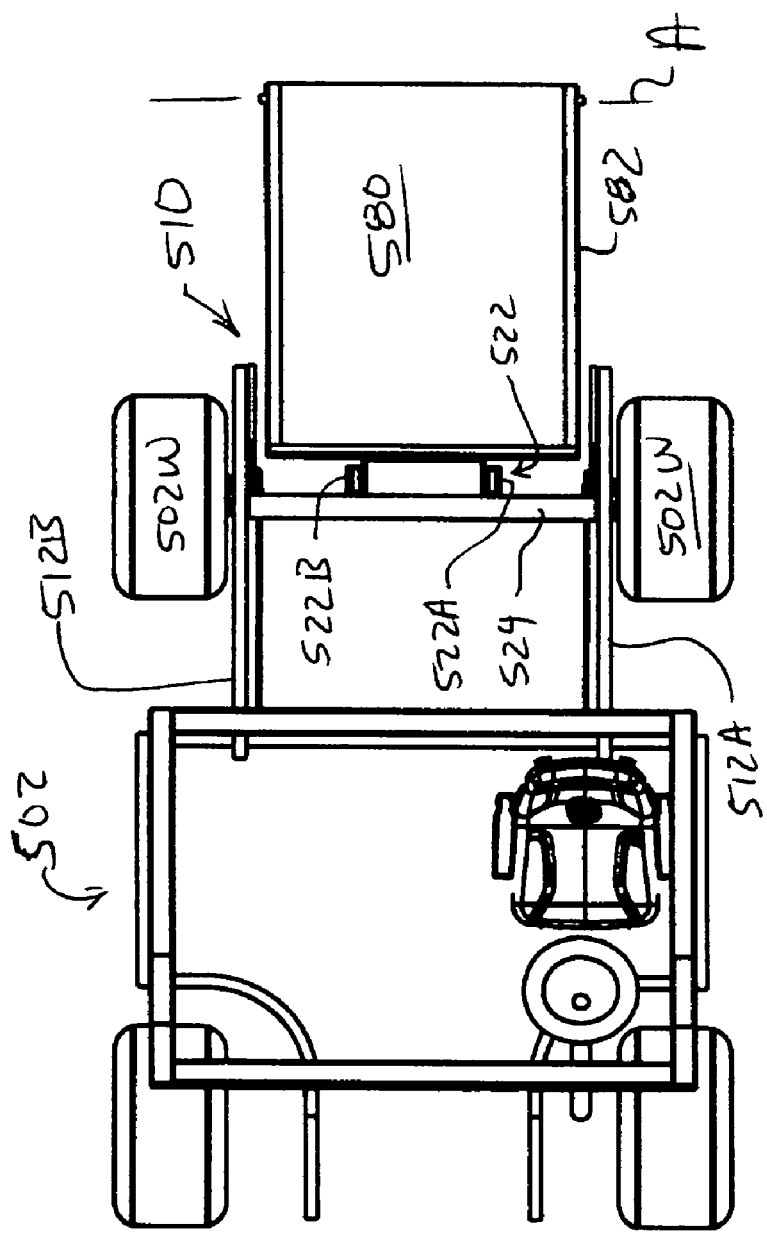
FIG. 26 is a top view showing a second embodiment of a translating cargo bed with the cargo bed in a rearward position.
Figure 27:
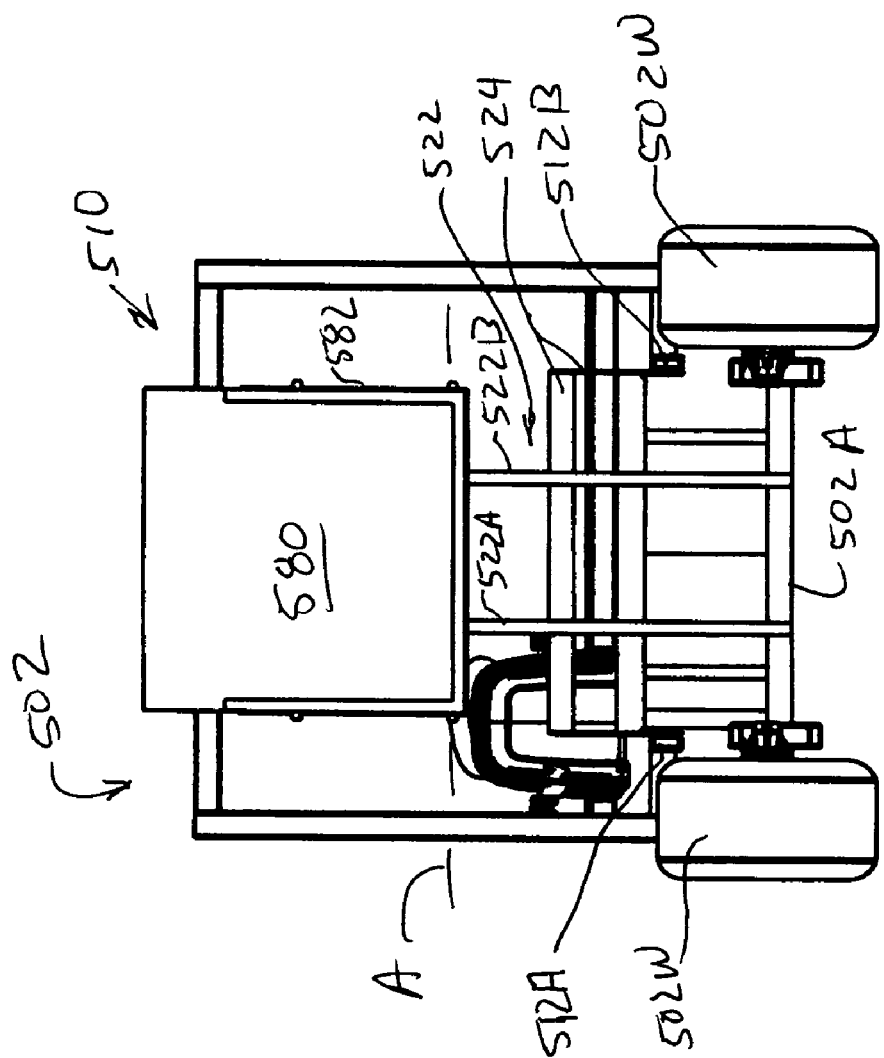
FIG. 27 is a rear view showing a second embodiment of a translating cargo bed with the cargo bed in a raised position.
Figure 28:
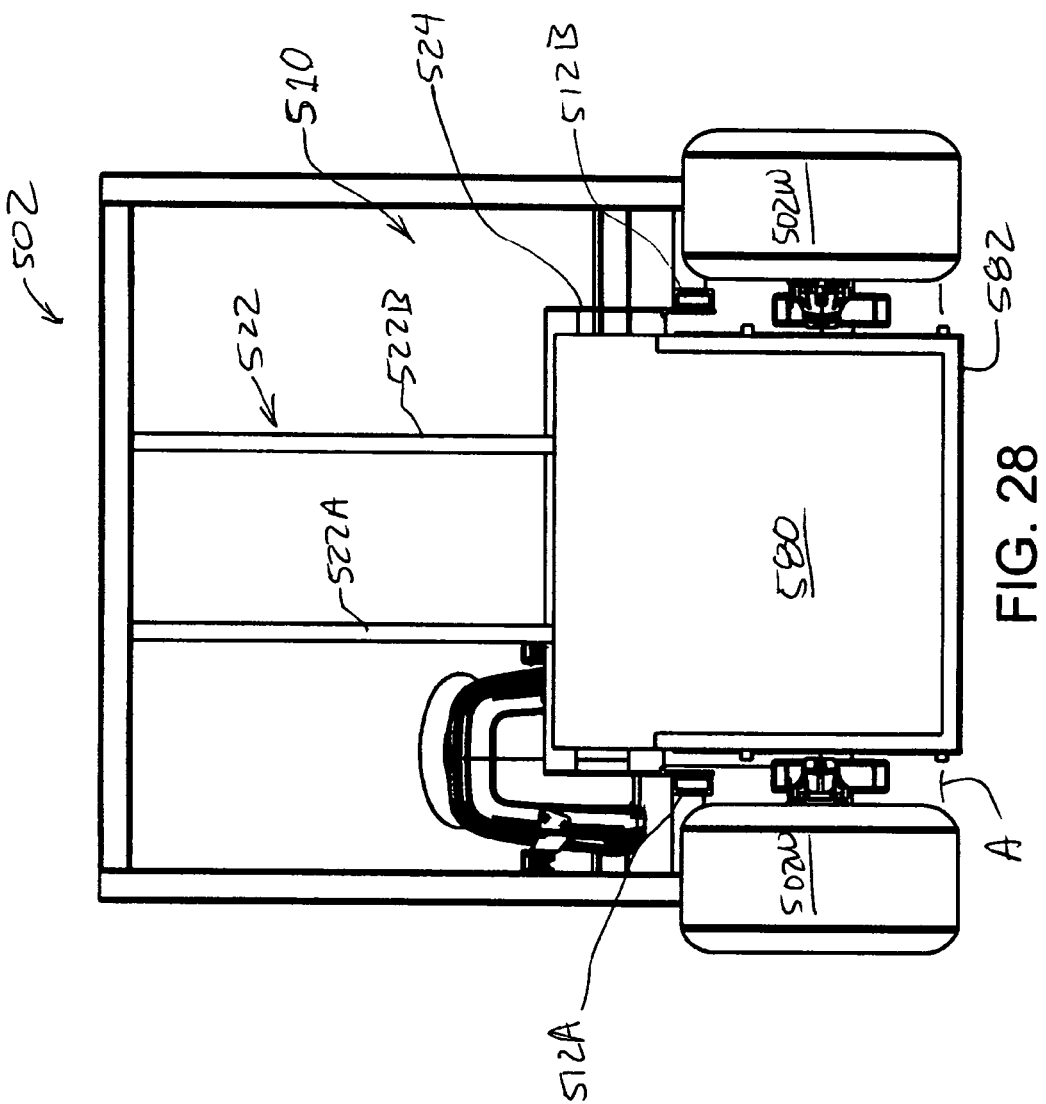
FIG. 28 is a rear view showing a second embodiment of a translating cargo bed with the cargo bed in a lowered position.

FIG. 25 should be understood as showing a top view of vehicle 502 when cargo bed 580 is in one of the positions shown in FIG. 19, 20 or 22 or within a range of positions between those positions and thus shows the horizontal location of the cargo bed when mast assembly 520 is in a forward position. FIG. 26 should be understood as showing a top view of vehicle 502 when cargo bed 580 is in one of the positions shown FIG. 21 or 23 or within a range of positions between those positions and thus shows the horizontal location of the cargo bed 580 when mast assembly 520 is in a rearward position. FIG. 27 should be understood as showing a rear view of vehicle 502 when cargo bed 580 is in one of the positions shown FIG. 22 or 23 or within a range of positions between those positions and thus shows the position of cargo bed 580 when vertical carriage assembly 530 is in a raised position. FIG. 28 should be understood as showing a rear view of vehicle 502 when cargo bed 580 is in one of the positions shown in FIGS. 20 or 21 or within a range of positions between those positions and thus shows the position of cargo bed 580 when vertical carriage assembly 530 is in a lowered position.

It is to be understood that while certain forms of this invention have been illustrated and described, it is not limited thereto, except in so far as such limitations are included in the following claims and allowable equivalents thereof.

I claim:

1. A cargo bed apparatus for a vehicle having a vehicle frame, comprising,
    (a) a cargo bed,
    (b) a cargo bed sub-frame supporting the cargo bed,
    (c) a movable frame connecting between the vehicle frame and the cargo bed sub-frame, the movable frame being operable for translating the cargo bed sub-frame between the following cargo bed operating positions;
        (i) a transport position,
        (ii) an elevated position,
        (iii) a lowered position,
    the cargo bed being pivotably mounted to the cargo bed sub-frame for pivoting between a generally level cargo loading and hauling positions and a tilted cargo dumping position whereby the cargo bed may be dumped from at least the transport and elevated positions.

2. The cargo bed apparatus of claim 1, wherein;
    the cargo bed sub-frame is generally level when in the operating positions and wherein the cargo bed sub-frame remains generally level when being translated from one operating position to another operating position.

3. The cargo bed apparatus of claim 1, wherein;
    the cargo bed operating positions further include a rearwardly extended position wherein the cargo bed is located at least partially behind the transport position.

4. The cargo bed apparatus of claim 1, wherein;
    the cargo bed operating positions further include a rearwardly extended position wherein the cargo bed is located behind the transport position and the cargo bed may be dumped when the cargo bed is in the rearwardly extended position.

5. The cargo bed apparatus of claim 1, wherein;
    the cargo bed operating positions further include an elevated rearwardly extended position wherein the cargo bed is elevated above the transport position and translated at least partially behind the transport position.

6. The cargo bed apparatus of claim 1, wherein;
    the cargo bed operating positions further include an elevated rearwardly extended position wherein the cargo bed is elevated above the transport position and translated completely behind the transport position and the cargo bed may be dumped when the cargo bed is in the elevated rearwardly extended position.

7. The cargo bed apparatus of claim 1, wherein;
the cargo bed operating positions further include a rearwardly extended position wherein the cargo bed is located at least partially behind the transport position and an elevated rearwardly extended position wherein the cargo bed is elevated above the transport position and translated completely behind the transport position and the cargo bed may be dumped when the cargo bed is in the rearwardly extended position or the elevated rearwardly extended position.

8. The cargo bed apparatus of claim 1, wherein;
the operating positions further include a lowered rearwardly extended position.

9. The cargo bed apparatus of claim 1, wherein:
the cargo bed is adapted to be removable from the cargo bed sub-frame.

* * * * *